US011171910B2

(12) United States Patent
O'Rourke et al.

(10) Patent No.: US 11,171,910 B2
(45) Date of Patent: Nov. 9, 2021

(54) SOCIAL NETWORK STATUS

(71) Applicant: Facebook, Inc., Menlo Park, CA (US)

(72) Inventors: Ryan Michael O'Rourke, San Francisco, CA (US); Henry Ming Wu, San Francisco, CA (US); Michael Ross Lewis, San Francisco, CA (US); Kuan-Yu Tseng, San Francisco, CA (US); Tae Dong Kim, Menlo Park, CA (US); Zhisheng Huang, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/733,185

(22) Filed: Jan. 2, 2020

(65) Prior Publication Data

US 2021/0105244 A1 Apr. 8, 2021

Related U.S. Application Data

(60) Provisional application No. 62/909,743, filed on Oct. 2, 2019.

(51) Int. Cl.
*H04L 12/58* (2006.01)
*G06F 9/54* (2006.01)
(Continued)

(52) U.S. Cl.
CPC .............. *H04L 51/32* (2013.01); *G06F 9/542* (2013.01); *G06F 16/9535* (2019.01); *G06Q 50/01* (2013.01); *H04L 51/02* (2013.01); *H04L 51/10* (2013.01); *H04L 51/20* (2013.01); *H04L 51/24* (2013.01); *H04L 67/22* (2013.01);

*H04L 67/26* (2013.01); *H04L 67/306* (2013.01); *H04W 4/027* (2013.01); *H04W 4/029* (2018.02)

(58) Field of Classification Search
CPC ......... H04L 51/32; H04L 51/20; H04L 51/02; H04L 67/22; H04L 67/30; H04W 4/029
USPC ...................................................... 709/206
See application file for complete search history.

(56) References Cited

U.S. PATENT DOCUMENTS 10,826,853 B1 * 11/2020 O'Rourke .............. G06Q 50/01
2012/0254184 A1 10/2012 Choudhary et al.
(Continued)

OTHER PUBLICATIONS

Office Action for U.S. Appl. No. 16/733,163, dated Oct. 27, 2020, O'Rourke, "Social Network Interactions", 5 Pages.
(Continued)

*Primary Examiner* — Glenford J Madamba
(74) *Attorney, Agent, or Firm* — Lee & Hayes, P.C.

(57) ABSTRACT

Systems and techniques are described that enable users to interact and share content through a social network application and/or service with other users. A social networking system may determine that a first application and a second application are installed on a device and are both useable to share content between a first account and one or more contact accounts. The social networking system may receive content associated with the first application and the second application and may generate a notification associated with the content. The social networking system may determine which of the first application or the second application to use to present the notification, and may output the notification to the determined first application and/or the second application.

20 Claims, 17 Drawing Sheets

(51) Int. Cl.
*H04L 29/08* (2006.01)
*H04W 4/029* (2018.01)
*G06Q 50/00* (2012.01)
*H04W 4/02* (2018.01)
*G06F 16/9535* (2019.01)

(56) References Cited

U.S. PATENT DOCUMENTS

| | | |
|---|---|---|
| 2014/0050122 A1 | 2/2014 | Pro et al. |
| 2014/0115455 A1 | 4/2014 | Kim |
| 2014/0310269 A1 | 10/2014 | Zhang et al. |
| 2014/0362254 A1 | 12/2014 | Kuwahara et al. |
| 2015/0177922 A1 | 6/2015 | Poletto et al. |
| 2017/0357432 A1* | 12/2017 | King .................. H04L 51/10 |
| 2017/0359504 A1 | 12/2017 | Manzari et al. |
| 2019/0147026 A1 | 5/2019 | Jon et al. |
| 2021/0103383 A1 | 4/2021 | O'Rourke et al. |
| 2021/0103995 A1 | 4/2021 | O'Rourke et al. |
| 2021/0105243 A1 | 4/2021 | Zeng et al. |

OTHER PUBLICATIONS

Office Action for U.S. Appl. No. 16/733,163, dated Mar. 31, 2021, O'Rourke, "Social Network Interactions," 34 pages.

* cited by examiner

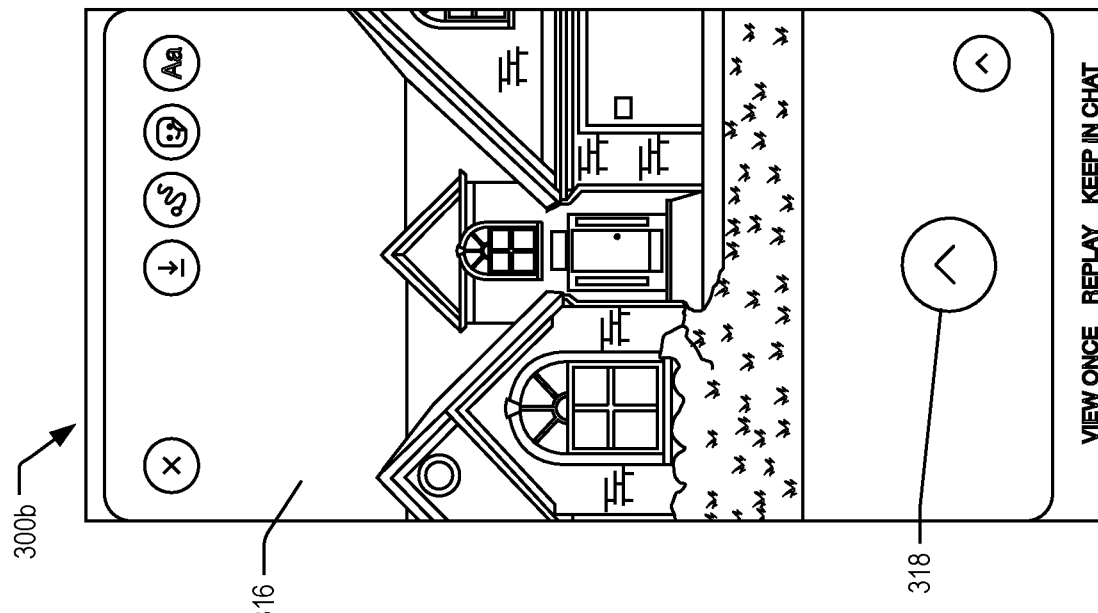
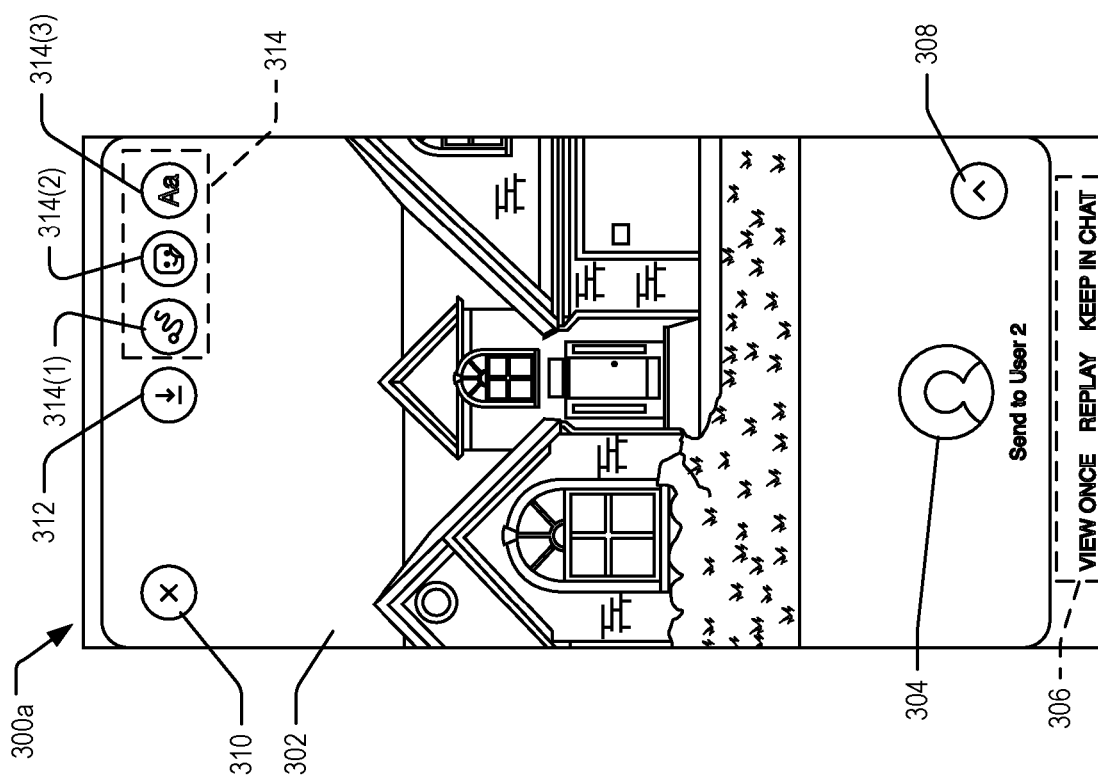
FIG. 3A
FIG. 3B

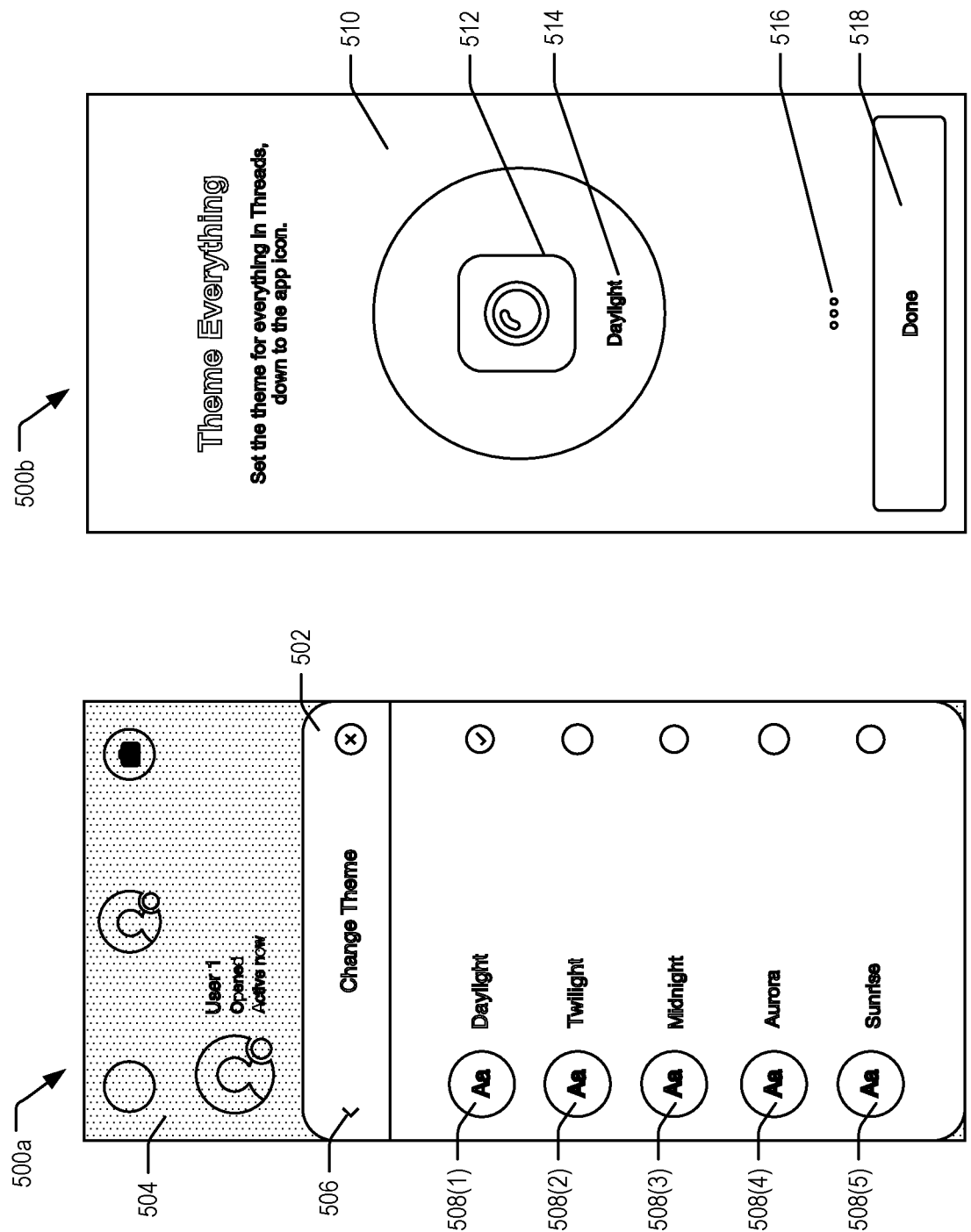

SOCIAL NETWORK STATUS

This application claims the benefit of priority of U.S. Provisional Application No. 62/909,743, filed Oct. 2, 2019, which is incorporated herein by reference.

BACKGROUND

With the proliferation of social network applications and/or services comes an increased interest to interact with one's network in a meaningful and often strategic way. Many social network platforms treat a user's contacts in a similar fashion. However, in cases where a user wants to interact differently with different groups within the user's network, current options are limited. For example, a user may network with friends, family, coworkers, or other personal or professional contacts. However, a user might not be interested in communicating the same information to all of those contacts and/or may not communicate with all contacts with equal frequency. In some cases, a user may use different social network platforms and/or applications to communicate with different types of contacts (e.g., friends and family on one social network and coworkers and professional contacts using a different social network). However, managing sharing of information across multiple social networks can be challenging and time consuming.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 3A and 3B illustrate example interfaces usable to send content from a user device.

FIGS. 5A and 5B illustrate example interfaces usable to present a number of themes selectable to apply to an application.

DETAILED DESCRIPTION

Figure 1:
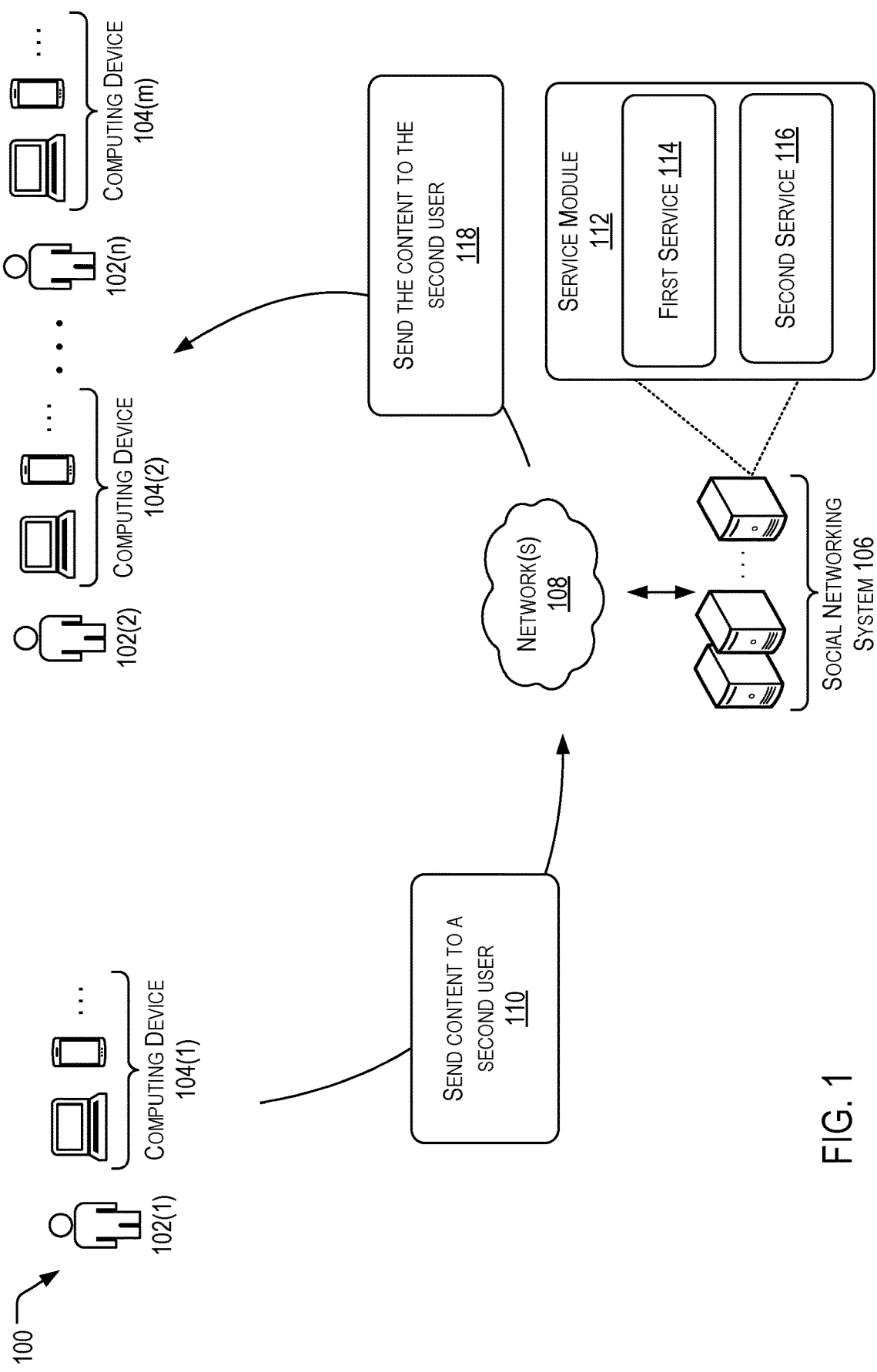
FIG. 1 is a schematic view of an example system usable to implement example techniques described herein.

As discussed above, users communicate differently with different connections in their networks. For instance, a user might not be interested in communicating the same information to all contacts, and/or may not communicate with all contacts with equal frequency. This application relates to techniques that simplify sharing of information with select contacts (e.g., close friends, favorite contacts, contacts the user communicates with most frequently, etc.).

For instance, in some examples, a user may have a network of contacts with a social networking service, which may include friends, family, coworkers, and/or other personal or professional contacts. Each contact may have an account with the social networking service. The user may designate a subset of the network of contacts as being "select contacts" with which the user wishes to be able to communicate differently than with other contacts in the network of contacts. In some examples, the select contacts may include close friends, favorite contacts, contacts the user communicates with most frequently, or the like. In some examples, the user may communicate with the network of contacts (including the select contacts) via a first application or service. A second application or service may be provided for use in communication specifically with one or more of the select contacts. The second application or service may be different than the first application or service. For instance, the second application or service may be configured to simplify communicating with the select contacts by streamlining the user interface, providing simplified controls and/or gestures, automatically sharing certain information with the select contacts according to the user's preferences, and the like. Additionally, notifications, badges, and other information may be coordinated between the first application and the second application to avoid redundancy and to provide accurate and timely information to the user. These and other examples simplify sharing of information with select contacts and give users greater control over how they share information with their network of contacts.

Various embodiments of the present disclosure include systems, methods, and non-transitory computer-readable media storing instructions to implement a social networking system.

Various embodiments of the present disclosure include systems, methods, and non-transitory computer-readable media of a social networking system.

In some examples, a device associated with a first account may display a camera capture interface including a control associated with a second account and may receive a selection of the control associated with the second account.

In some examples, the device may capture content responsive to the selection and present a preview screen of captured content.

In some examples, the device may receive an indication to perform an action with respect to the captured content. For example, the action may include sending the captured content to the second account, and the indication comprises a swipe gesture or selection of a send control.

In some examples, the swipe gesture includes movement across the screen in a direction substantially toward a top of the preview screen.

In some examples, the action includes deleting the captured content, and the indication comprise a swipe gesture or selection of a delete control.

In some examples, the swipe gesture includes a movement across the screen in a direction substantially toward a bottom of the preview screen.

In some examples, the second account comprises a contact associated with the first account.

In some examples, the control associated with the second account comprises a group control and is further associated with a third account, and the group control is displayed as a plurality of overlapping circles.

In some examples, in response to the selection of the control associated with the second account, the device may present a capture progress indicator while the control is selected, where the capture progress indicator changes to show an indication of the duration of the captured content.

In some examples, in response to the indication to perform the action, the device may present an action selection progress indicator while the indication is received, where the action selection progress indicator changes to show an indication of a selected action prior to the completion of the selected action.

In some examples, the indication comprises one or more of a gesture or selection of a control. In the case of a gesture, the gesture may include a swipe and hold, a swipe and release, or a swipe past a threshold distance across the screen.

In some examples, a device associated with a first account may display a camera capture interface including a control associated with a second account and may detect a touch at a location on the screen associated with an area not associated with the control.

In some examples, the device may determine that a duration of the touch exceeds a threshold.

In some examples, the device may capture content responsive to the touch and the determination. In some examples, the device may present a preview screen of captured content.

In some examples, the device may detect a release of the touch and complete capturing the content based on the detected release.

In some examples, the device may receive an indication to perform an action with respect to the captured content. For example, the action may include sending the captured content to the second account. In some examples, the indication may include a swipe gesture or selection of a send control.

In some examples, in response to the touch, the device may present a capture progress indicator while the touch is detected, where the capture progress indicator changes to show an indication of the duration of the captured content.

In some examples, the device may detect a new location on the screen of the touch, and may present a capture progress indicator while the touch is detected at the new location.

In some examples, in response to the indication to perform the action, the device may present an action selection progress indicator while the indication is received, where the action selection progress indicator changes to show an indication of a selected action prior to the completion of the selected action.

In some examples, the indication comprises one or more of a gesture or selection of a control, the gesture including a swipe and hold, a swipe and release, or a swipe past a threshold distance across the screen.

In some examples, a device may display on a screen multiple theme options of an application.

In some examples, the device may receive a selection of a theme option of the multiple theme options, and in response to the selection, apply a theme associated with the selected theme option to the application. In some examples, the theme may include one or more of a color scheme of the application, an icon associated with the application displayed on a menu of the device, or a brightness of a display of the device.

In some examples, the theme is based on settings associated with one or more of a time of day, a time of year, a season, a holiday, or an event.

In some examples, the device may display a preview of the theme upon selection of a theme selection control, and update the theme responsive to selection of a theme setting control.

In some examples, the preview of the theme includes changing the icon corresponding to the application.

In some examples, the preview of the theme includes changing an appearance of the theme selection control based at least in part on selection of the theme selection control.

In some examples, a device associated with a first account may display on a screen one or more controls associated with a plurality of other accounts.

In some examples, the device may detect an indication gesture.

In some examples, the device may determine, based on the indication gesture, a type of indication gesture.

In some examples, in response to the indication gesture and when the indication gesture is determined to be a first type of indication gesture, the device may display a portion of a conversation associated with a contact proximate to the detected indication gesture.

In some examples, in response to the indication gesture and when the indication gesture is determined to be a second type of indication gesture, the device may display an image capture indicator associated with the contact proximate to the detected indication gesture.

In some examples, in response to the indication gesture and when the indication gesture is determined to be a third type of indication gesture, the device may display an image capture screen associated with the contact proximate to the detected indication gesture.

In some examples, the first type of gesture may be a touch and hold, swipe and hold, a swipe and release, or a swipe past a threshold distance across the screen.

In some examples, the second type of gesture may be a touch and hold, swipe and hold, a swipe and release, or a swipe past a threshold distance across the screen. In some examples, the second type of gesture may be a swipe and hold to or toward a side of the display.

In some examples, the third type of gesture may be a touch and hold, swipe and hold, a swipe and release, or a swipe past a threshold distance across the screen. In some examples, the third type of gesture may be a swipe past a threshold towards a top or bottom of the display.

In some examples, a social networking system may receive a status heartbeat associated with a first account, where the status heartbeat includes at least one of first location information and first activity information associated with the first account.

In some examples, the social networking system may determine a status signal based at least in part on a context associated with the first account and the status heartbeat.

In some examples, the social networking system may determine, based at least in part on the status signal, a status associated with the first account, where the status includes at least one of second location information or second activity information associated with the user device.

In some examples, at least one of the second location information or second activity information is less specific than the at least one of the first location information and first activity information associated with the first account.

In some examples, the social network system may send the status to a second account.

In some examples, the status heartbeat includes one or more of a location, a location inference, a velocity, an acceleration, or a charge state of a device associated with the first account.

In some examples, the context associated with the first account includes one or more of a user context, location context, or weather.

In some examples, the status signal includes one or more of a location, a location inference, a velocity, an acceleration, a charge state, a user context, location context, or weather.

In some examples, the status includes one or more of text, a symbol, and an image.

In some examples, the status includes a categorized location or categorized activity of a user associated with the first account.

In some examples, the second account is selected from a list of user accounts approved by a user associated with the first account.

In some examples, the second account includes a contact associated with the first account.

In some examples, the second account is selected, from a list of user accounts associated with the first user account, to receive status information about the first account.

In some examples, a device associated with a social networking system may identify a triggering event on a user device associated with a first account. In response to the triggering event, the device may generate a status heartbeat including at least one of first location information or first activity information associated with the user device.

In some examples, the device may send the status heartbeat to a remote device associated with the social networking system.

In some examples, the device may receive from the remote device, a status associated with the first account, the status including at least one of second location information or second activity information associated with the user device.

In some examples, at least one of the second location information or second activity information is less specific than the at least one of the first location information or first activity information associated with the user device.

In some examples, the status heartbeat includes one or more of a location, a location inference, a velocity, an acceleration, or a charge state.

In some examples, the location inference includes determining a primary location and a secondary location based at least in part on a plurality of visit determinations.

In some examples, the location inference includes clustering visit determinations of the plurality of visit determinations based on proximity to each other.

In some examples, the location inference includes determining a first predetermined location based at least in part on a cluster representing a first determined amount of time spent during a first portion of a day.

In some examples, the location inference includes determining a second predetermined location based at least in part on a cluster representing a second determined amount of time spent during a second portion of the day, where the first portion of a day and the second portion of a day are different.

In some examples, the first portion of the day is associated with a first range of times and the second portion of the day is associated with a second range of times different than the first range of times.

In some examples, the first determined amount of time spent during a first portion of a day is greater than an amount of time spent during a first portion of a day at other clustered visit determinations.

In some examples, the second determined amount of time spent during a second portion of a day is greater than an amount of time spent during a second portion of a day at other clustered visit determinations.

In some examples, the location inference includes determining whether the user device associated with the first account is at a first predetermined location, at a second predetermined location, a first predetermined region, or that the location of the user device is undetermined.

In some examples, the location inference includes, when the user device is determined to be stationary within a first threshold distance of the first predetermined location, inferring the first predetermined location.

In some examples, the location inference includes, when the user device is determined to be stationary within a second threshold distance of the second predetermined location, inferring the second predetermined location.

In some examples, inferring the location includes, when the user device is determined to be beyond a third threshold distance from both the first predetermined location and second predetermined location, inferring a first predetermined region.

In some examples, inferring the location includes, when a location of the user device cannot be determined, inferring an undetermined status.

In some examples, the triggering event includes one or more of a change in location, a change in velocity, a change in acceleration, a change in charging state, a received push notification, a change in an application state, a media capture, a communication connection change, or an expiration of a time interval.

In some examples, the remote device includes a server of a social networking service, and wherein the first account and the second account are associated with the social networking service.

In some examples, the user device receives a selection to clear location data from the user device or uninstall an application on the user device associated with generating a heartbeat for the first account.

In some examples, in response to receiving the selection to clear location data or to uninstall the application, the user device deletes from memory of the user device, the location, the location inference, and visit information.

In some examples, a social networking system determines that a first application and a second application are installed on a device and are both useable to share content between a first account and one or more contact accounts.

In some examples, the social networking system receives content associated with a second account of the one or more contact accounts and associated with the first application and the second application.

In some examples, the social networking system generates a notification associated with the content.

In some examples, the social networking system determines which of the first application or the second application to use to present the notification.

In some examples, the social networking system outputs the notification to the first application and/or the second application.

In some examples, the social networking system determines which of the first application or the second application to use to present the notification.

In some examples, the determining which of the applications to use to present the notification includes determining the first application is in a foreground of the device.

In some examples, when the first application is determined to be in the foreground, the social networking system determines whether the first application is displaying a conversation associated with content.

In some examples, when the first application is in the foreground and displaying the conversation associated with the content, the social networking system causes the display of the content in the conversation and refrains from causing display of the notification in the first application and second application.

In some examples, when the first application is in the foreground and not displaying the conversation associated with the content, delivering the notification to the first application and refraining from displaying the notification in the second application.

In some examples, the determining which of the first application or the second application to use to present the notification includes determining the first application is not in a foreground of the device, and determining whether the second application is in the foreground of the device.

In some examples, when the second application is determined to not be in the foreground, the social networking system delivers the notification to the second application, and refrains from displaying the notification in the first application.

In some examples, when the second application is determined to be in the foreground, the social networking system determines whether the second application is displaying a conversation associated with content.

In some examples, when the second application is determined to be in the foreground and displaying the conversation associated with the content, the social networking system causes display of the content in the conversation and refrains from causing display of the notification in the first application and second application.

In some examples, when the second application is determined to be in the foreground and not displaying the conversation associated with the content, the social networking system delivers the notification to the second application and refrains from causing display of the notification in the first application.

In some examples, the determining which of the first application or the second application includes selecting the second application when the content is associated with a first contact account of the one or more contact accounts, the first contact account being associated with a designated list of contact accounts.

In some examples, the determining which of the first application or the second application includes selecting the first application when the content is associated with a second contact account of the one or more contact accounts, the second contact account not being associated with the designated list of contact accounts.

In some examples, the determining which of the first application or the second application includes determining the first application is in the foreground of the device. In some examples, when the first application is determined to be in the foreground, the social networking system delivers the notification to the first application and refrains from causing display of the notification in the second application.

In some examples, the determining which of the first application or the second application is in the foreground is done at the device.

In some examples, the notification includes at least one of a banner notification, a lock screen notification, a badge count notification, or a notification center notification.

In some examples, a social networking system determines that a first application and a second application are installed on a device and are both useable to share content between a first account and one or more contact accounts.

In some examples, the social networking system receives content associated with an account of the one or more contact accounts and associated with the first application and the second application.

In some examples, the social networking system determines which of the first application or the second application to use to present a notification associated with the received content.

In some examples, the social networking system generates a notification associated with the content for the determined first application or second application and refrains from generating a notification associated with the content for the first application or second application not determined to use to present the notification.

In some examples, the social networking system outputs the notification to the determined first application or second application.

In some examples, the determining which of the first application or the second application to use to present the notification includes the social networking system determining the first application is in a foreground of the device.

In some examples, when the first application is determined to be in the foreground, the social networking system determines whether the first application is displaying a conversation associated with content.

In some examples, when the first application is in the foreground and displaying the conversation associated with the content, the social networking system causes the display of the content in the conversation and refrains from causing the display of the notification in the first application and second application.

In some examples, when the first application is in the foreground and not displaying the conversation associated with the content, the social networking system delivers the notification to the first application and refrains from causing the display of the notification in the second application.

In some examples, the determining which of the first application or the second application to use to present the notification includes determining the first application is not in a foreground of the device, and determining whether the second application is in the foreground of the device.

In some examples, when the second application is determined to not be in the foreground, the social networking system delivers the notification to the second application, and refrains from displaying the notification in the first application.

In some examples, when the second application is determined to be in the foreground, the social networking system determines whether the second application is displaying a conversation associated with content.

In some examples, when the second application is determined to be in the foreground and displaying the conversation associated with the content, the social networking system causes display of the content in the conversation and refrains from causing display of the notification in the first application and second application.

In some examples, when the second application is determined to be in the foreground and not displaying the conversation associated with the content, the social networking system delivers the notification to the second application and refrains from causing display of the notification in the first application.

In some examples, the determining which of the first application or the second application to use to present the notification includes selecting the second application when the content is associated with a first contact account of the one or more contact accounts, the first contact account being associated with a designated list of contact accounts.

In some examples, the determining which of the first application or the second application to use to present the notification includes selecting the first application when the content is associated with a second contact account of the one or more contact accounts, the second contact account not being associated with the designated list of contact accounts.

In some examples, the determining which of the first application or the second application to use to present the notification includes determining the first application is in the foreground of the device. In some examples, when the first application is determined to be in the foreground, the social networking system delivers the notification to the first application and refrains from causing display of the notification in the second application.

In some examples, the determining which of the first application or the second application is done at the device.

In some examples, the notification includes at least one of a banner notification, a lock screen notification, a badge count notification, or a notification center notification.

In some examples, a social networking system determines that a first application and a second application are installed on a device and are both useable to share content between a first account and one or more contact accounts.

In some examples, the social networking system detects an event that causes a change in a badge count.

In some examples, the social networking system determines which of the first application or the second application to display the change in the badge count including determining whether the event is associated with a contact account, of the one or more contact accounts, and whether the contact account is selected to receive content through the second application.

In some examples, when the event is determined to not be associated with a selected contact account, the social networking system determines, based on the event, a first badge count change.

In some examples, when the event is determined to be associated with a selected contact account, the social networking system determines, based on the event, a second badge count change.

In some examples, the social networking system outputs the first badge count change to the determined first application and/or the second badge count change to the determined second application.

In some examples, the event that causes a change in the badge count includes receiving an indication that one or more of an item of the first application or second application has been viewed, a new item has been received, or an unsend request, associated with an unviewed item, has been received.

In some examples, the indication that an item of the first application or second application has been viewed decreases the badge count, the indication that a new item has been received increases the badge count, and an unsend request, associated with an unviewed item, has been received decreases the badge count.

In some examples, the social networking system detects another event that causes a second change in a badge count.

In some examples, the social networking system determines that the other event is associated with the contact account associated with the event.

In some examples, the social networking system determines whether the other event causes a same type of change in the badge count.

In some examples, when the other event is determined to be a same type of change in the badge count, the social networking system refrains from changing the first badge count or second badge count.

In some examples, when the other event is determined to not be a same type of change in the badge count, the social networking system changes, based on the other event, the first badge count or second badge count.

In some examples, the social networking system detects another event that causes a second change in a badge count.

In some examples, the social networking system determines that the other event is associated with another contact account, of the one or more contact accounts, and the other contact account is selected to receive content through the second application.

In some examples, the social networking system determines whether the other event causes a different type of change in the badge count.

In some examples, when the other event is determined to be a different type of change in the badge count, the social networking system refrains from changing the first badge count or second badge count.

In some examples, when the other event is determined to not be a different type of change in the badge count, the social networking system changes, based on the other event, the first badge count and/or second badge count.

In some examples, the social networking system determines a previous time of outputting a previous badge count.

In some examples, the social networking system delays the outputting the first badge count change to the determined first application or the second badge count change to the determined second application until a difference between the previous time and a current time exceeds a threshold.

In some examples, the social networking system determines that an operating system running the first application and second application does not allow the first application and the second application to directly interact.

In addition to the improvements discussed above, the techniques described herein also improve performance of one or more computing devices by reducing an amount of content sent over a network. For instance, by providing users a with a streamlined application or interface, users are able to share information much more quickly and easily than using existing platforms. Additionally, by only sending notifications and updating badging associated with a message from a contact in one location (e.g., via one application or service), the social network system can reduce the number of notifications and/or badge update messages sent. In this way, the quantity of data sent over the network may be reduced and an amount of electricity consumed by the user's device to receive these messages may be reduced. Additionally, by coordinating the presentation of notifications and badge updates, the number of notifications presented on the user's device can be reduced avoiding redundancy and further reducing the amount of electricity consumed by the user's device to display the notifications and/or badge updates.

These and other aspects are described further below with reference to the accompanying drawings. The drawings are merely example implementations and should not be construed to limit the scope of the claims. For example, while examples are illustrated in the context of a user interface for a mobile device, the techniques may be implemented using any computing device and the user interface may be adapted to the size, shape, and configuration of the particular computing device. Also, while the select contacts are described in various examples as the user's close friends, favorite contacts, or contacts the user communicates with most frequently, in other examples, the select contacts may be selected contacts. Also, while the select contacts are described in some examples as being a subset of the user's network of contacts, in some examples, some or all of the contacts with whom the user communicates using the second application or service may be different than those with whom the user communicates using the first application or service.

Example System Architecture

FIG. 1 is a schematic view of an example computing system 100 usable to implement example techniques described herein to control a number of users participating in a social network application and/or service via the system 100. In some examples, the system 100 may include users 102(1), 102(2), . . . 102(n) (collectively "users 102") to interact using computing devices 104(1), 104(2), . . . 104(m) (collectively "computing devices 104") with a social networking system 106 via a network 108. In this example, n and m are non-zero integers greater than 1.

Each of the computing devices 104 includes one or more processors and memory storing computer executable instructions to implement the functionality discussed herein attributable to the various computing devices. In some examples, the computing devices 104 may include desktop computers, laptop computers, tablet computers, mobile devices (e.g., smart phones or other cellular or mobile phones, mobile gaming devices, portable media devices, etc.), or other suitable computing devices. The computing devices 104 may execute one or more client applications, such as a web browser (e.g., Microsoft Windows Internet Explorer, Mozilla Firefox, Apple Safari, Google Chrome, Opera, etc.) or a native or special-purpose client application (e.g., social media applications, messaging applications, email applications, games, etc.), to access and view content over the network 108.

The network 108 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the computing devices 104 may access the social networking system 106 and/or communicate with one another.

The social networking system 106 may include one or more servers or other computing devices, any or all of which may include one or more processors and memory storing computer executable instructions to implement the functionality discussed herein attributable to the social networking system or digital platform. The social networking system 106 may enable its users 102 (such as persons or organizations) to interact with the social networking system 106 and with each other via the computing devices 104. The social networking system 106 may, with input from a user, create and store in the social networking system 106 a user account associated with the user. The user account may include demographic information, communication-channel information, and information on personal interests of the user. The social networking system 106 may also, with input from a user, create and store a record of relationships of the user with other users of the social networking system, as well as provide services (e.g., posts, comments, photo-sharing, messaging, tagging, mentioning of other users or entities, games, etc.) to facilitate social interaction between or among the users 102.

The social networking system 106 may be configured to control which users 102 and how many users 102 have access to services provided by the social networking system 106.

For example, at operation 110, a service module 112 of the social networking system 106 may receive, via a first service 114 or second service 116, content directed to user 102(2). For example, a first computing device 104(1) that is associated with a first user 102(1) may store a first application that is associated with the first service 114. The first application may include an inbox that stores messages. In some examples, the social networking system 106 may also support a second service 116 associated with a second application that may include an inbox that stores messages.

In some examples, the social networking system 106 may determine which of the first or second service to send a message from user 102(1) to user 102(2). For example, user 102(1) may designate user 102(2) as a being a select contact. As such, user 102(1) may send content to user 102(2), for example, at operation 110 through network 108 to social networking system 106. In this example, social networking system 106 may determine service to use to deliver the content to user 102(2). For example, since user 102(1) designated user 102(2) as a select contact, social networking system 106 may send the content to user 102(2) via the second service 116. However, in another example, user 102(1) may not have designated user 102(2) as a select contact. In that example, social networking system 106 may deliver the content to user 102(2) via the first service 114.

As such, at operation 118, the social networking system 106 delivers the content to user 102(2) via the appropriate first or second service.

In some examples, the social networking system 106 may provide privacy features to the users 102 while interacting with the social networking system 106. In particular examples, one or more objects (e.g., content or other types of objects) of the computing system 100 may be associated with one or more privacy settings. The one or more objects may be stored on or otherwise associated with any suitable computing system or application, such as, for example, the social networking system 106, a client system, a third-party system, a social networking application, a messaging application, a photo-sharing application, or any other suitable computing system or application. Although the examples discussed herein are in the context of an online social network, these privacy settings may be applied to any other suitable computing system. Privacy settings (or "access settings") for an object or item of content may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" and/or a "restricted list" of users or other entities that should not be allowed to access certain information associated with the object. In particular examples, the blocked list may include third-party entities. The blocked list or restricted list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular examples, privacy settings may be based on one or more nodes or edges of a social graph. A privacy setting may be specified for one or more edges or edge-types of the social graph, or with respect to one or more nodes or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a user 102(1) may share an object to the social networking system 106. The object may be associated with a concept node connected to a user node of the user 102(1) by an edge. The user 102(1) may specify privacy settings that apply to a particular edge connecting to the concept node of the object, or may specify privacy settings that apply to all edges connecting to the concept node. In some examples, the user 102(1) may share a set of objects of a particular object-type (e.g., a set of images). The user 102(1) may specify privacy settings with respect to all objects associated with the user 102(1) of that particular object-type as having a particular privacy setting (e.g., specifying that all images posted by the user 102(1) are visible only to friends of the user and/or users tagged in the images).

In particular examples, the social networking system 106 may present a "privacy wizard" (e.g., within a webpage, a module, one or more dialog boxes, or any other suitable interface) to the user 102(1) to assist the user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the social networking system 106 may offer a "dashboard" functionality to the user 102(1) that may display, to the user 102(1), current privacy settings of the user 102(1). The dashboard functionality may be displayed to the user 102(1) at any appropriate time (e.g., following an input from the user 102(1) summoning the dashboard functionality, following the occurrence of a particular event or trigger action). The dashboard functionality may allow the user 102(1) to modify one or more of the user's current privacy settings at any time, in any suitable manner (e.g., redirecting the user 102(1) to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, one or more servers of the social networking system 106 may be authorization/privacy servers for enforcing privacy settings. In response to a request from the user 102(1) (or other entity) for a particular object stored in a data store, the social networking system 106 may send a request to the data store for the object. The request may identify the user 102(1) associated with the request and the object may be sent only to the user 102(1) (or a client system of the user) if the authorization server determines that the user 102(1) is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular examples, an object may represent content that is visible to a user through a newsfeed of the user. As an example and not by way of limitation, one or more objects may be visible to a user's "Trending" page. In particular examples, an object may correspond to a particular user. The object may be content associated with the particular user, or may be the particular user's account or information stored on the social networking system 106, or other computing system. As an example and not by way of limitation, the user 102(1) may view one or more other users 102(2) . . . 102(*n*) of an online social network through a "People You May Know" function of the online social network, or by viewing a list of friends of the user 102(1). As an example and not by way of limitation, the user 102(1) may specify that they do not wish to see objects associated with a particular other user (e.g., the user 102(2)) in their newsfeed or friends list. If the privacy settings for the object do not allow it to be surfaced to, discovered by, or visible to the user 102(1), the object may be excluded from the search results. Although this disclosure describes enforcing privacy settings in a particular manner, this disclosure contemplates enforcing privacy settings in any suitable manner.

In particular examples, different objects of the same type associated with a user may have different privacy settings. Different types of objects associated with a user may also have different types of privacy settings. As an example and not by way of limitation, the user 102(1) may specify that the user's status updates are public, but any images shared by the user are visible only to the user's friends on the online social network. In some examples, the user 102(1) may specify different privacy settings for different types of entities, such as individual users, friends-of-friends, followers, user groups, or corporate entities. In some examples, the user 102(1) may specify a group of users that may view videos posted by the user 102(1), while keeping the videos from being visible to the user's employer. In particular examples, different privacy settings may be provided for different user groups or user demographics. As an example and not by way of limitation, the user 102(1) may specify that other users who attend the same university as the user 102(1) may view the user's pictures, but that other users who are family members of the user 102(1) may not view those same pictures.

In particular examples, the social networking system 106 may provide one or more default privacy settings for each object of a particular object-type. A privacy setting for an object that is set to a default may be changed by a user associated with that object. As an example and not by way of limitation, all images posted by the user 102(1) may have a default privacy setting of being visible only to friends of the first user and, for a particular image, the user 102(1) may change the privacy setting for the image to be visible to friends and friends-of-friends.

In particular examples, privacy settings may allow the user 102(1) to specify (e.g., by opting out, by not opting in) whether the social networking system 106 may receive, collect, log, or store particular objects or information associated with the user 102(1) for any purpose. In particular examples, privacy settings may allow the user 102(1) to specify whether particular applications or processes may access, store, or use particular objects or information associated with the user. The privacy settings may allow the user 102(1) to opt in or opt out of having objects or information accessed, stored, or used by specific applications or processes. The social networking system 106 may access such information in order to provide a particular function or service to the user 102(1), without the social networking system 106 having access to that information for any other purposes. Before accessing, storing, or using such objects or information, the social networking system 106 may prompt the user 102(1) to provide privacy settings specifying which applications or processes, if any, may access, store, or use the object or information prior to allowing any such action. As an example and not by way of limitation, the user 102(1) may transmit a message to the user 102(2) via an application related to the online social network (e.g., a messaging app), and may specify privacy settings that such messages should not be stored by the social networking system 106.

In particular examples, the user 102(1) may specify whether particular types of objects or information associated with the user 102(1) may be accessed, stored, or used by the social networking system 106. As an example and not by way of limitation, the user 102(1) may specify that images sent by the user 102(1) through the social networking system 106 may not be stored by the social networking system 106. In some examples, the user 102(1) may specify that messages sent from the user 102(1) to another user 102(2) may not be stored by the social networking system 106. In some cases, the user 102(1) may specify that all objects sent via a particular application may be saved by the social networking system 106.

In particular examples, privacy settings may allow the user 102(1) to specify whether particular objects or information associated with the user 102(1) may be accessed from particular client systems or third-party systems. The privacy settings may allow the user 102(1) to opt in or opt out of having objects or information accessed from a particular device (e.g., the phone book on a user's smart phone), from a particular application (e.g., a messaging app), or from a particular system (e.g., an email server). The social networking system 106 may provide default privacy settings with respect to each device, system, or application, and/or the user 102(1) may be prompted to specify a particular privacy setting for each context. As an example and not by way of limitation, the user 102(1) may utilize a location-services feature of the social networking system 106 to provide recommendations for restaurants or other places in proximity to the user 102(1). The default privacy settings of the user 102(1) may specify that the social networking system 106 may use location information provided from the computing device 104(1) of the user 102(1) to provide the location-based services, but that the social networking system 106 may not store the location information of the user 102(1) or provide it to any third-party system. The user 102(1) may then update the privacy settings to allow location information to be used by a third-party image-sharing application in order to geo-tag photos.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. In some examples, a company may post content related to a product release ahead of the official launch, and specify that the content may not be visible to other users until after the product launch.

In particular examples, for particular objects or information having privacy settings specifying that they are ephemeral, the social networking system 106 may be restricted in its access, storage, or use of the objects or information. The social networking system 106 may temporarily access, store, or use these particular objects or information in order to facilitate particular actions of a user associated with the objects or information, and may subsequently delete the objects or information, as specified by the respective privacy settings. As an example and not by way of limitation, the user 102(1) may transmit a message to the user 102(2), and the social networking system 106 may temporarily store the message in a data store until the user 102(2) has viewed or downloaded the message, at which point the social networking system 106 may delete the message from the data store. In some examples, continuing with the prior example, the message may be stored for a specified period of time (e.g., 2 weeks), after which point the social networking system 106 may delete the message from the data store.

In particular examples, changes to privacy settings may take effect retroactively, affecting the visibility of objects and content shared prior to the change. As an example and not by way of limitation, the user 102(1) may share a first image and specify that the first image is to be public to all other users. At a later time, the user 102(1) may specify that any images shared by the user 102(1) should be made visible only to a first user group. The social networking system 106 may determine that this privacy setting also applies to the first image and make the first image visible only to the first user group. In particular examples, the change in privacy settings may take effect only going forward. Continuing the example above, if the user 102(1) changes privacy settings and then shares a second image, the second image may be visible only to the first user group, but the first image may remain visible to all users. In particular examples, in response to a user action to change a privacy setting, the social networking system 106 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the social networking system 106 may determine that user 102(1) may want to change one or more privacy settings in response to a trigger action associated with the user 102(1). The trigger action may be any suitable action on the online social network. As an example and not by way of limitation, a trigger action may be a change in the relationship between a first and second user of the online social network (e.g., "un-friending" a user, changing the relationship status between the users, etc.). In particular examples, upon determining that a trigger action has occurred, the social networking system 106 may prompt the user 102(1) to change the privacy settings regarding the visibility of objects associated with the user 102(1). The prompt may redirect the user 102(1) to a workflow process for editing privacy settings with respect to one or more entities associated with the trigger action. The privacy settings associated with the user 102(1) may be changed only in response to an explicit input from the user 102(1), and may not be changed without the approval of the user 102(1). As an example and not by way of limitation, the workflow process may include providing the user 102(1) with the current privacy settings with respect to the user 102(2) or to a group of users (e.g., un-tagging the user 102(1) or the user 102(2) from particular objects, changing the visibility of particular objects with respect to the user 102(2) or a group of users), and receiving an indication from the user 102(1) to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social networking system 106 may determine that such action may be sensitive and may prompt the user to confirm that his or her relationship status should remain public before proceeding. In some examples, a user's privacy settings may specify that the user's posts are visible only to friends of the user. However, if the user changes the privacy setting for his or her posts to being public, the social networking system 106 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the social networking system 106 may send a reminder to the user to confirm his or her privacy settings every six months or after every ten photo posts. In particular examples, privacy settings may also allow users to control access to the objects or information on a per-request basis. As an example and not by way of limitation, the social networking system 106 may notify the user whenever a third-party system attempts to access information associated with the user, and require the user to provide verification that access should be allowed before proceeding.

While these privacy features are discussed with respect to FIG. 1, FIG. 1 serves as an example. These privacy features are also equally applicable to the systems and examples discussed with respect to the other figures as well.

Example User Interfaces and Techniques

FIGS. 2A-2D are schematic views showing example streamlined user interfaces that are usable to implement the techniques described herein for capturing content to share with one or more select contacts. The interfaces and/or the notifications may be generated by a computing device of a social networking system (e.g., social networking system 106) and transmitted to one or more user computing devices (e.g., computing devices 104) for presentation, and/or the interfaces may be generated by the one or more user computing devices based at least in part on instructions received from the social networking system. As discussed above, the interfaces described in this section may, but need not, be implemented in the context of the system 100.

Figure 2B:
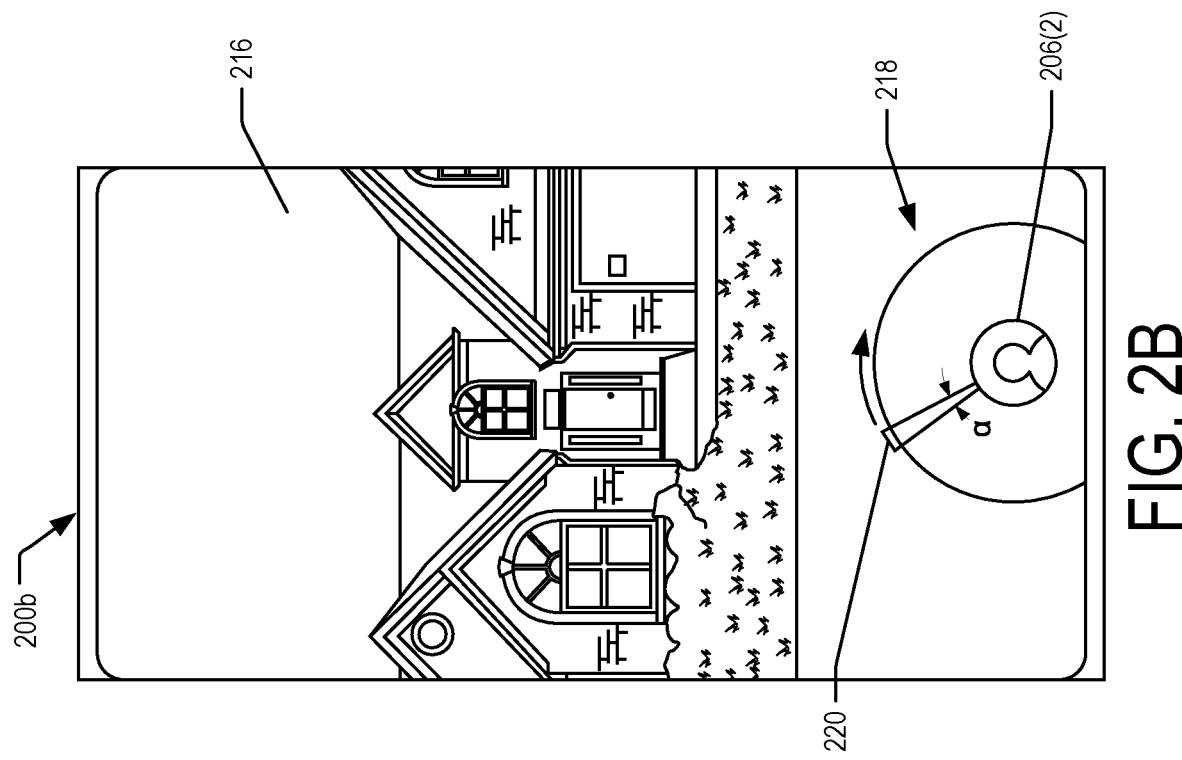
FIGS. 2A-2D illustrate example interfaces usable to capture content from a user device.
Figure 2A:
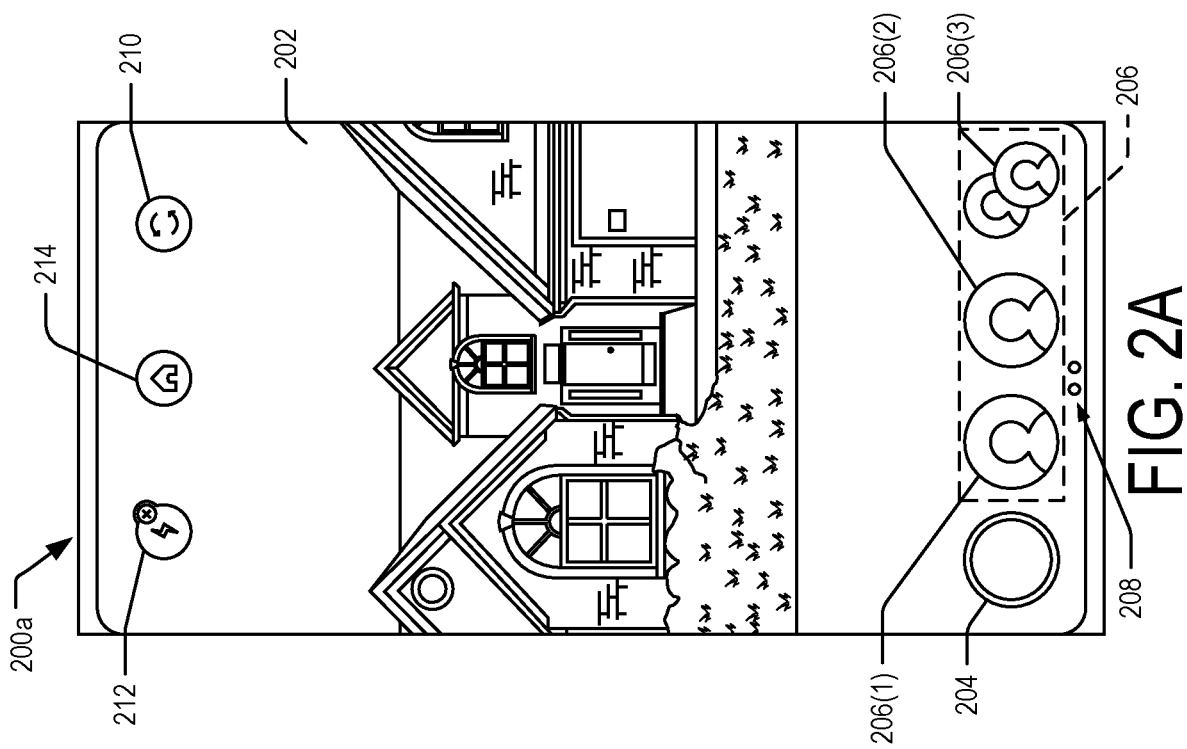

FIG. 2A illustrates a first interface 200a of an application or service (e.g., the second service 116) presented on a computing device of a first user (e.g., computing device 104(1) of user 102(1)) for sharing information with one or more contacts (e.g., select contacts). The first interface 200a in this example includes a camera view 202 including a live field of view of a camera of the computing device and a camera capture control 204 selectable by the user to capture content (e.g., images and/or video) using the camera. Additionally, the first interface 200a includes multiple contact capture controls 206. In this example, the multiple contact capture controls 206 include a first contact capture control 206(1) usable to capture content for sharing with a first contact, a second contact capture control 206(2) usable to capture content for sharing with a second contact, and a third contact capture control 206(3) usable to capture content for sharing with a group of contacts (which may include the first contact, the second contact, and/or one or more additional contacts). Selection of the first contact capture control 206(1) by the user may cause content in the camera view at the time to be captured for sharing with the first contact, as described with reference to FIG. 2B, for example. Similarly, selection of the second contact capture control 206(2) may cause content in the camera view at the time to be captured for sharing with the second contact, and selection of the third contact capture control 206(3) may cause content in the camera view at the time to be captured for sharing with the group of contacts. While the third contact capture control 206(3) is illustrated as two overlapping circles to denote that the group comprises two contacts, in other examples, the contact capture controls can include any number of overlapping circles or other indicators to designate a number of contacts in the group (e.g., 2, 3, 4, . . . n, where n is any integer greater than 1). The contact capture controls 206 included on the first interface 200a may be selected or configured by the first user from within the application or service, or may be automatically populated based on, for example, one or more settings in another application or service (e.g., the first service 114). For instance, in some examples, the contact capture controls 206 in the application or service may be automatically configured based on a list of close friends or favorite contacts in a second application or service.

In some examples, a touch selection of the camera capture control 204 or one of the contact capture controls 206 may cause a picture (e.g., still image or series of still images) to be captured, while a press-and-hold selection of the camera capture control 204 or one of the contact capture controls 206 may cause video to be captured until the camera capture control 204 or the contact capture control 206 is released.

While in the illustrated example, the first interface 200a is shown to include three contact capture controls, in other examples, any number of one or more contact capture controls may be presented on the interface 200a. Additionally, interface 200a includes a scroll indicator 208 which indicates that additional contact capture controls are available and may be viewed by scrolling, swiping, or otherwise navigating through the available contact capture controls 206 (e.g., by swiping left and right, pressing a left or right scroll arrow, etc.).

The first interface 200a in this example also includes a camera switch control 210 to switch between cameras (e.g., a front facing camera, a rear facing camera, a wide-angle camera, a telephoto camera, etc.) of the computing device and a flash control 212 to control operation of a flash of the computing device (e.g., between off, on, and/or auto flash settings). The first interface 200a in this example also includes a home control 214 usable to navigate to a home interface or direct message inbox of the user (e.g., such as that shown in FIG. 4A).

FIG. 2B illustrates a second interface 200b which may be displayed responsive to selection of the second contact capture control 206(2) in FIG. 2A. The second interface 200b may include a live capture view 216 corresponding to the content (e.g., image or video) being captured responsive to selection of the second contact capture control 206(2), as well as a progress indicator 218 showing a progress or duration of the content being captured. The progress indicator 218 in this example includes a circle centered around the second contact capture control 206(2) with a scan beam 220 which rotates clockwise around the circle in the direction of arrow while the second contact capture control 206(2) is selected. An angle α of the scan beam 220 may also increase over time to visually illustrate a duration of recorded content. Upon release of the second contact capture control 206(2) a captured content preview may be presented. An example of a captured content preview that may be displayed in response to release of the second contact capture control 206(2) is described below with reference to FIG. 3A.

Figure 2C:
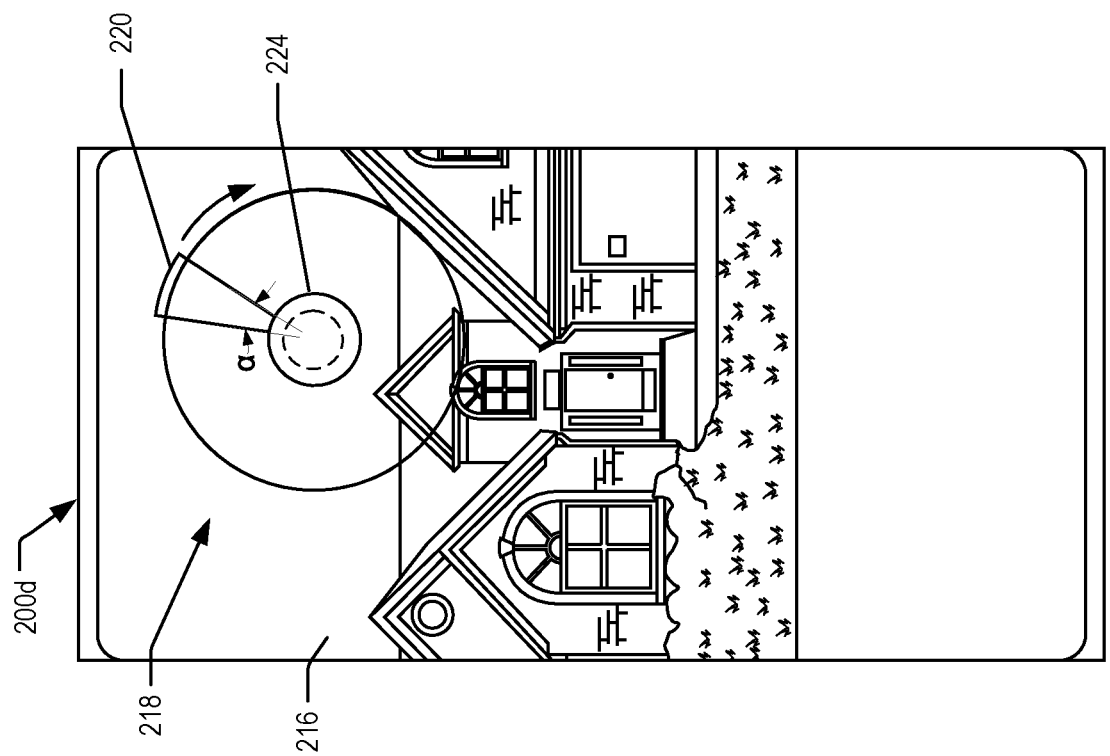

FIG. 2C illustrates a third interface 200c which may be displayed responsive to selection of the camera capture control 204 in FIG. 2A. The third interface 200c may be similar to the second interface 200b and includes a live capture view 216 and the progress indicator 218 including the scan beam 220. However, in the third interface 200c the progress indicator 218 is centered around the camera capture control 204, and content captured in response to selection of the camera capture control 204 is not automatically associated with any particular contact. Also, FIG. 2C illustrates a scenario in which the camera capture control 204 has been selected for a longer duration than the example shown in FIG. 2B as illustrated by the larger angle α of the scan beam 220 in this figure. Upon release of the camera capture control 204, a captured content preview may be presented. An example of a captured content preview that may be displayed in response to release of the camera capture control 204 is described below with reference to FIG. 3B.

Figure 2D:
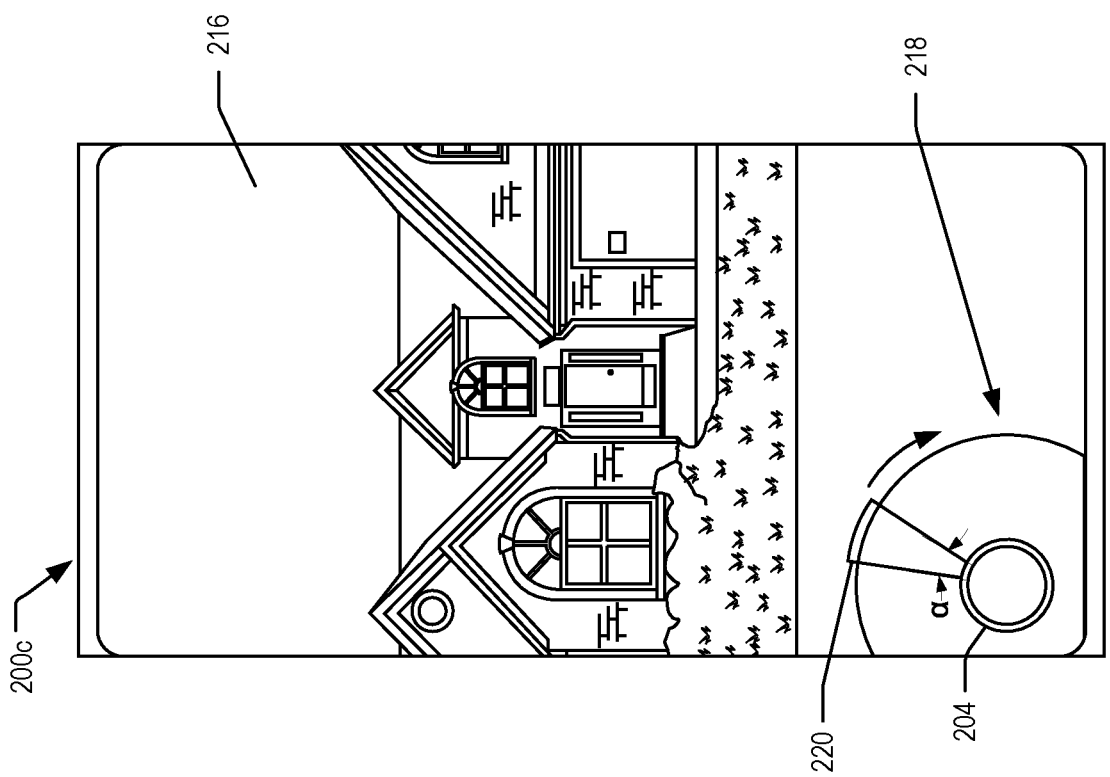

FIG. 2D illustrates a fourth interface 200d which may be displayed responsive to a gesture, such as a press-and-hold gesture, anywhere on the camera view 202 in FIG. 2A other than the camera capture control 204 and the contact capture controls 206. Responsive to detection of the gesture (e.g., the press-and-hold gesture) on the camera view 202, a live capture view 216 similar to that shown in FIGS. 2B and 2C may be presented. In some examples, a touch capture indicator 224 may be presented to visually indicate a location at which the gesture was detected, and the progress indicator 218 may be presented at the location on the screen where the gesture was detected. As in the preceding examples, the progress indicator 218 in this example is illustrated as a circle with a scan beam 220 which rotates clockwise to indicate progress, the scan beam having an angle α representing a duration of the recorded content. In this example, the progress indicator 218 is centered around the touch capture indicator 224 where the gesture was detected. Upon release of the gesture (e.g., the press-and-hold gesture), a captured content preview may be presented. An example of a captured content preview that may be displayed in response to release of the gesture is described below with reference to FIG. 3B.

While example circular progress indicators 218 are shown in FIGS. 2B-2D, other progress indicators may be used. By way of example and not limitation, other progress indicators that may be used include a progress bar, a timer, a clock, a progressive shading of the interface from top to bottom or side to side, or any other indicator of progress and/or duration of the captured content.

Figure 3D:
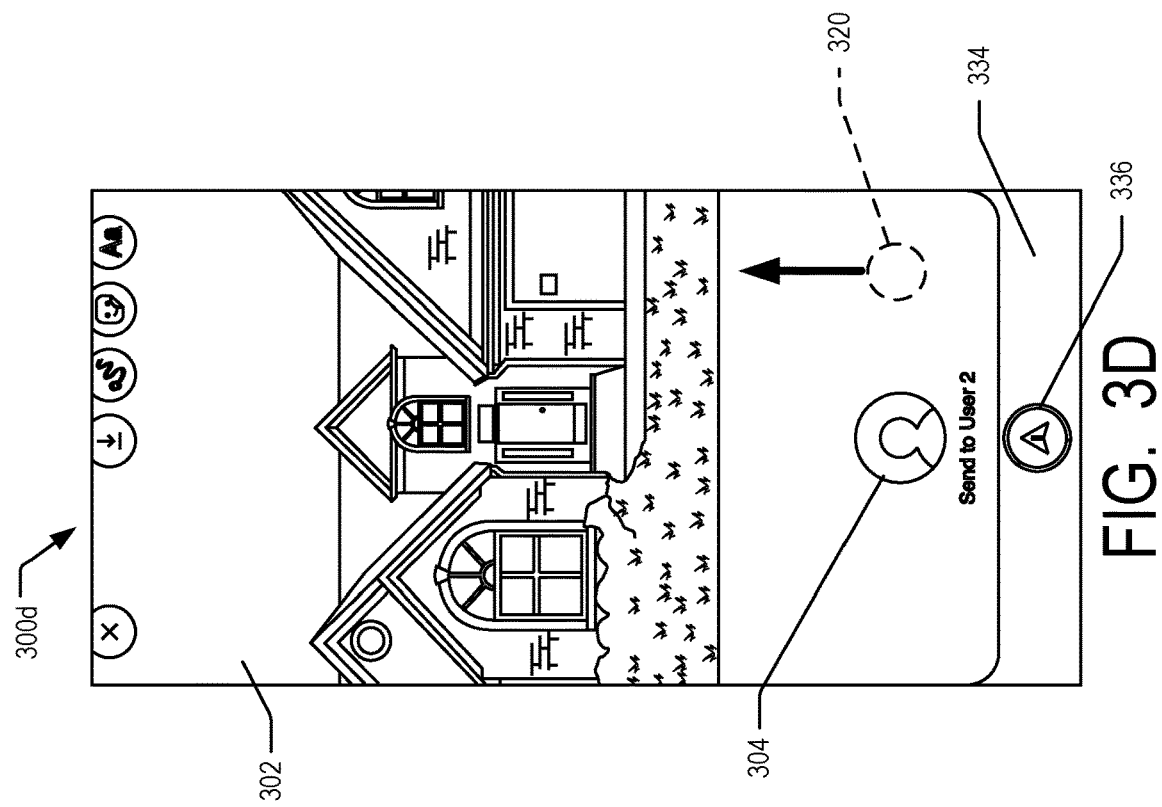
FIG. 3D illustrates an example user interface and gestures usable to send captured content.

FIG. 3A illustrates a fifth interface 300a and is an example of a captured content preview 302 that may be presented upon release of a contact capture control, such as the second contact capture control 206(2). The captured content preview 302 may correspond to an image or a loop of video that was captured responsive to selection of the contact capture control. The fifth interface 300a also includes a contact icon 304 indicating the contact to whom the content is to be shared. The contact icon 304 in this example may correspond to the second contact associated with the second contact capture control 206(2) which was used to initiate capture of the content. In some examples, the content may be sent to the second contact by touching or otherwise selecting the contact icon 304 and/or by a gesture (e.g., a swipe up gesture as described below with reference to FIG. 3D). The fifth interface 300a may also include one or more selectable playback controls 306 usable to configure how the content is to be played back by the receiving contact's device. For instance, the playback controls 306 may indicate that the content is to be viewed once, to be replayed multiple times, or to be kept in chat (e.g., stored in a message session between the user and the receiving contact). The fifth interface 300a may also include a controls menu 308 usable add one or more additional recipients of the content, a delete control 310 to delete the content without sending (the content may additionally or alternatively be deleted responsive to a gesture such as a swipe down gesture as described below with reference to FIG. 3C), a save control 312 to save the content, and/or one or more annotation controls 314. In the illustrated examples, the annotation controls 314 include a drawing control 314(1), an emoji control 314(2), and a text control 314(3), however, other annotation controls are also envisioned (e.g., audio annotation controls, animation annotation controls, etc.).

FIG. 3B illustrates a sixth interface 300b and is an example of a captured content preview 316 that may be presented upon release of the camera capture control 204 described with reference to FIG. 2C and/or release of the press-and-hold gesture described with reference to FIG. 2D. The sixth interface 300b is similar to fifth interface 300a, except that instead of presenting the contact icon 304, the sixth interface presents a contact selection icon 318 usable to select one or more contacts with whom to share the captured content.

Figure 3C:
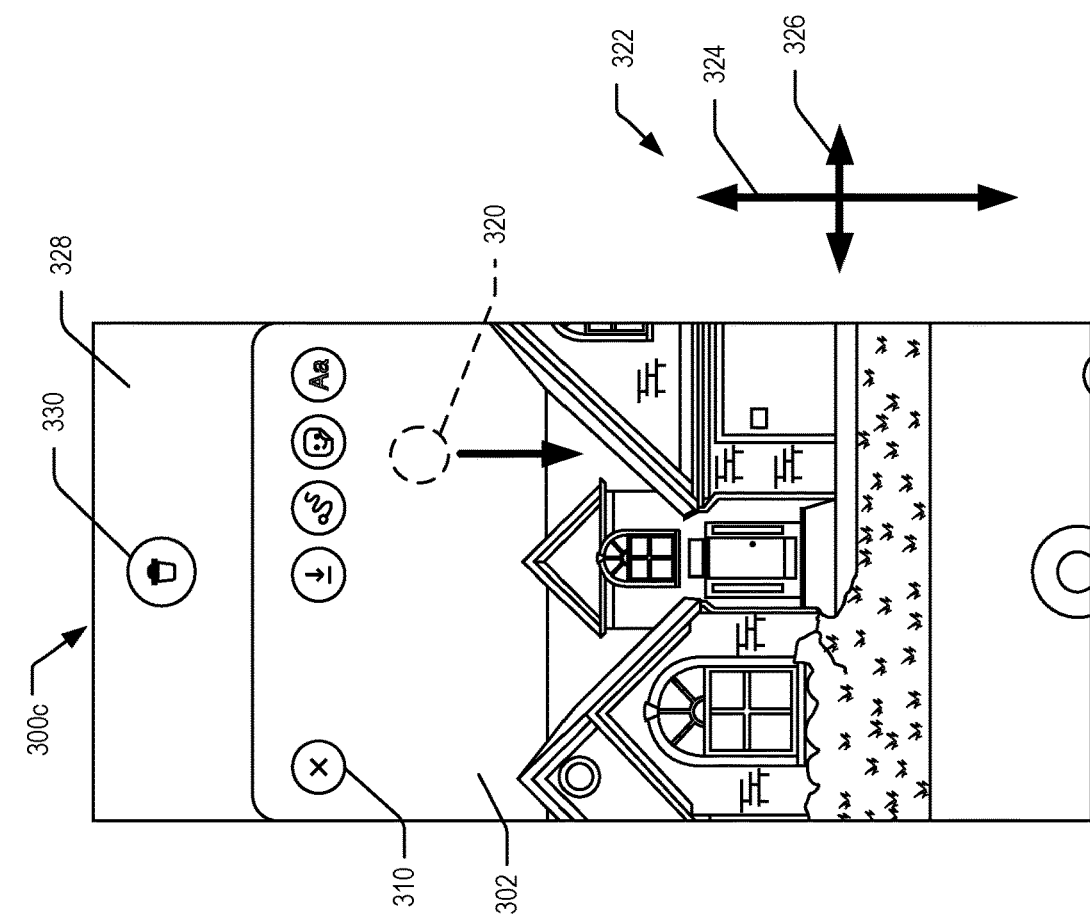
FIG. 3C illustrates an example user interface and gestures usable to delete captured content.

FIG. 3C illustrates a seventh interface 300c depicting an example in which a gesture is usable to delete captured content. For instance, interface 300c shows the captured content preview 302 of FIG. 3A. In order to delete the content depicted by the captured content preview 302 the user can select the delete control 310 as described with reference to FIG. 3A. Alternatively, the user can perform a gesture, in this example a swipe down gesture, to delete the content depicted by the captured content preview 302. For instance, FIG. 3C illustrates an example in which the user has touched the screen at a location 320 within the captured content preview 302 and has swiped downward (as indicated by the arrow directly below location 320). As a frame of reference, a coordinate system 322 is provided which represents the dimensions of an example user device. The coordinate system 322 has a long axis 324 which may correspond to a long axis of the user's computing device and a short axis 326 which may correspond to a short axis of the user's computing device. The interface 300c (and any other interface described herein) can be oriented in portrait mode (with a top and bottom of the interface disposed at opposite ends of the long axis 324) or a landscape mode (with the top and bottom of the interface disposed at opposite ends of the short axis 326). In some examples, the orientation of the interface may be automatically oriented based at least in part on gravity, for example, as determined by an accelerometer of the device. Additionally or alternatively, the user may be able to set the orientation of the interface on the computing device manually. As used herein, "down" and "downward" refer to a direction toward a bottom of the interface 300c, regardless of an orientation of the interface on the computing device.

As the user swipes downward, the touch location 320 and the captured content preview 302 slides downward on the interface 300c, exposing an action indication region 328. In some examples, the action indication region 328 may be colored to signal an action being taken. For instance, in the case of deleting content, the action indication region 328 may be shaded red to indicate that if the gesture is persisted, the content will be deleted. Additionally, in some examples, an action indication icon 330 may be provided in the action indication region 328 or elsewhere on the interface to further visually convey to the user the action the swipe down gesture causes. In the illustrated example, the action indication icon 330 is illustrated as a trash can icon. However, in other examples, other icons or symbols may be used (e.g., a bomb, a paper shredder, etc.). In some examples, the swipe down gesture may be a progressive gesture such that the action indication region 328 and/or the action indication icon 330 may be presented and may change (e.g., grow, change color, change shade, change intensity, etc.) over the course of the gesture to show progress toward completion of the gesture. In some examples, the gesture may be completed upon the user swiping a threshold distance on the display, swiping for a threshold amount of time, and/or swiping and releasing (e.g., removing the touch from the interface). Upon completion of the gesture, a visualization (e.g., an explosion, a crumpling animation, an animation of the captured content preview 302 being moved into a trashcan, etc.) may be presented to confirm deletion, and the captured content preview 302 may be removed and another interface (e.g., interface 200a of FIG. 2A) may again be displayed.

FIG. 3D illustrates an eight interface 300d depicting an example in which a gesture is usable to send or share content. For instance, interface 300d shows the captured content preview 302 of FIG. 3A. In order to send or share the content depicted by the captured content preview 302 the user can select the contact icon 304 as described with reference to FIG. 3A. Alternatively, the user can perform a gesture, in this example a swipe upward gesture (toward a top of the interface 300d), to send or share the content depicted by the captured content preview 302 with the contact. For instance, FIG. 3D illustrates an example in which the user has touched the screen at a location 332 within the captured content preview 302 and has swiped downward (as indicated by the arrow directly above location 332). As used herein, "up" and "upward" refer to a direction toward a top of the interface 300c, regardless of an orientation of the interface on the computing device.

As the user swipes upward, the touch location 332 and the captured content preview 302 slides upward on the interface 300d, exposing an action indication region 334. In some examples, the action indication region 334 may be colored to signal an action being taken. For instance, in the case of sending or sharing content, the action indication region 334 may be shaded blue or green to indicate that if the gesture is persisted, the content will be sent or shared. Additionally, in some examples, an action indication icon 336 may be provided in the action indication region 334 or elsewhere on the interface to further visually convey to the user the action the swipe up gesture causes. In the illustrated example, the action indication icon 336 is illustrated as a paper airplane icon. However, in other examples, other icons or symbols may be used (e.g., an envelope, a memo page, etc.). In some examples, the swipe up gesture may be a progressive gesture such that the action indication region 334 and/or the action indication icon 336 may be presented and may change (e.g., grow, change color, change shade, change intensity, etc.)

over the course of the gesture to show progress toward completion of the gesture. In some examples, the gesture may be completed upon the user swiping a threshold distance on the display, swiping for a threshold amount of time, and/or swiping and releasing (e.g., removing the touch from the interface). Upon completion of the gesture, a visualization (e.g., the paper airplane icon flying away, an envelope being put in a mailbox, etc.) may be presented to confirm sending or sharing of the content, and the captured content preview 302 may be removed and another interface (e.g., interface 200a of FIG. 2A) may again be displayed.

Figure 4B:
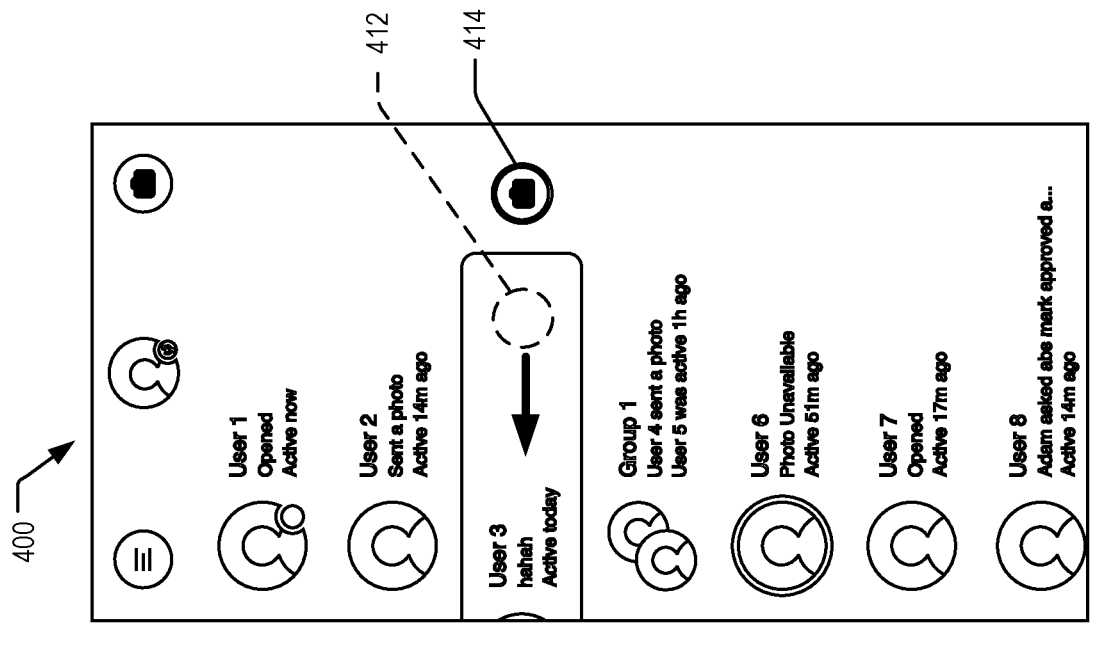
FIGS. 4A and 4B illustrate example interfaces and gestures usable to initiate capturing content to send to a particular contact.
Figure 4A:
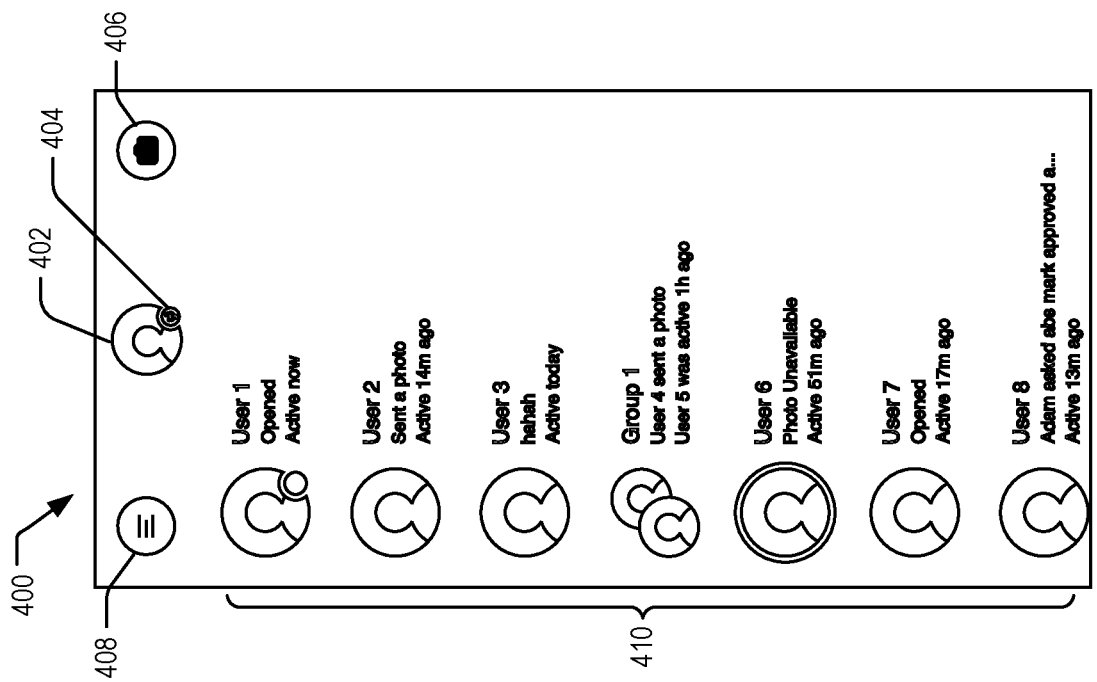

FIGS. 4A and 4B illustrate an example of initiating a capturing of content to share with a contact from a home screen or direct message inbox of the user.

FIG. 4A illustrates an example direct message inbox 400 of the user. As shown, the direct message inbox 400 of the user includes a user profile icon 402 representing the user account of the user and a status indicator 404 representing a current status of the user. The status indicator 404 may be set automatically or manually as discussed further below with reference to FIG. 8. The direct message inbox 400 of the user may also include a camera control 406 and a settings control 408. Selection of the camera control 406 may cause presentation of a camera view interface such as that shown in FIG. 2A to capture content for sharing. Selection of the setting control 408 may cause presentation of a settings menu, usable to manage a list of select contacts (e.g., close friends), manage automatic and/or manual status indications, configure the number and identity of contact capture controls 206, create and manage groups, and the like.

The direct message inbox 400 also includes a list of direct message conversations 410 with different contacts (User 1, User 2, User 3, etc.) and/or groups (Group 1, etc.). Selection of a contact or group from the direct message inbox opens a dialog interface showing recent messages between the user and the respective contact or group.

FIG. 4B illustrates an example, in which a gesture (e.g., a swipe left gesture) may be used to initiate capturing of content to be shared with a particular contact or group in the list of direct message conversations 410. In this example, the user can perform a gesture, in this example a swipe left gesture (toward a left of the direct message inbox 400), associated with one of the conversations in the list of direct message conversations 410 to launch an interface (e.g., interface 200b shown in FIG. 2B) usable to capture content to be shared with a contact or group corresponding to the respective direct message conversation. For instance, FIG. 4B illustrates an example in which the user has touched the screen at a location 412 adjacent to an entry in the list of direct message conversations 410 corresponding to User 3 and has swiped left (as indicated by the arrow directly to the left of location 412). While FIG. 4B illustrates a swipe left gesture, in other examples a swipe right gesture may be used to launch the interface (e.g., interface 200b) usable to capture content to be shared with the respective contact or group. As used herein, "left" and "right" refer to directions toward a left and right, respectively, of the direct message inbox 400, regardless of an orientation of the interface on the computing device.

In the illustrated example, as the user swipes left, the touch location 412 and the entry in the list of direct message conversations 410 corresponding to User 3 slide left on the interface, exposing an action indication icon 414. In some examples, swipe left gesture may be a progressive gesture such that the action indication icon 414 may be presented and may change (e.g., grow, change color, change shade, change intensity, be progressively encircled, etc.) over the course of the gesture to show progress toward completion of the gesture. In some examples, the gesture may be completed upon the user swiping a threshold distance on the display, swiping for a threshold amount of time, and/or swiping and releasing (e.g., removing the touch from the interface). Upon completion of the gesture, the direct message inbox 400 may be removed and another interface (e.g., interface 200b of FIG. 2B) may again be displayed to capture content to be shared with the respective contact (User 3 in this example).

FIGS. 5A and 5B illustrate an example of initiating a theme selection to affect the appearance of the application.

FIG. 5A illustrates an example direct message inbox 500a of the user with a theme selection menu 502 in the foreground. As shown, the direct message inbox 500a acts as a screen 504 to which a preview of the theme is to be applied. The theme selection menu 502 may include theme menu control 506 operable to navigate additional options. Theme selection menu 502 also includes theme controls 508(1)-(5). Theme controls 508(1)-(5) may include an icon with an appearance suggestive of the related theme option. Theme controls 508(1)-(5) may be selectable by a user. Upon selection, the selected theme may be previewed in screen 504. Additionally or alternatively, the theme may be previewed on portions of theme selection menu 502.

Additionally, upon completion of selection of the theme, the theme may be applied to the application. For example, may include one or more of a color scheme of the application, an icon associated with the application displayed on a menu of the device, or a brightness of a display of the device. Other examples include the theme being based on or inspired by one or more of a time of day, a time of year, a season, a holiday, or an event among others. Examples include the them being related to one or more of daylight, twilight, midnight, aurora, and/or sunrise.

FIG. 5B illustrates an example theme display 500b. In this example, theme display 500b may show a preview screen 510 of the currently displayed theme. Theme display 500b may also include a theme icon 512 that may have colors and shading reflective of the associated theme. Additionally, the theme icon 512 may be representative of the application icon that is displayed on a device's system menus and screens. Theme display 500b may also include a theme label 514 associated with the selected theme. Theme display 500b may also include indicator 516 indicating the presence of other selectable themes. Indicator 516 may also indicate where the current theme selection is in relation to other selectable themes. Theme display 500b may also include section control 518, selectable to accept and apply the displayed theme to the application and the application's icon.

Example Status System Architecture and Techniques

An illustrative status system provides automatic status updates. In examples, automatic status updates provide a way for a user to let a contact (e.g., friend) know what the user is up to without actively sending the friend a message. In some examples, the status system will periodically update the user's status based on signals from the user's device and/or application. In examples, the status system may provide a status update that simplifies, distills, and/or generalizes the status of the user. In examples, the user may control when and/or how often a status is updated and in examples, control which contacts receive the status. Some of these features, among others, may provide a simpler, more secure, more reliable, and more desirable way of communicating with contacts while maintaining a desired level of privacy when compared to currently available platforms and technology.

Figure 6:
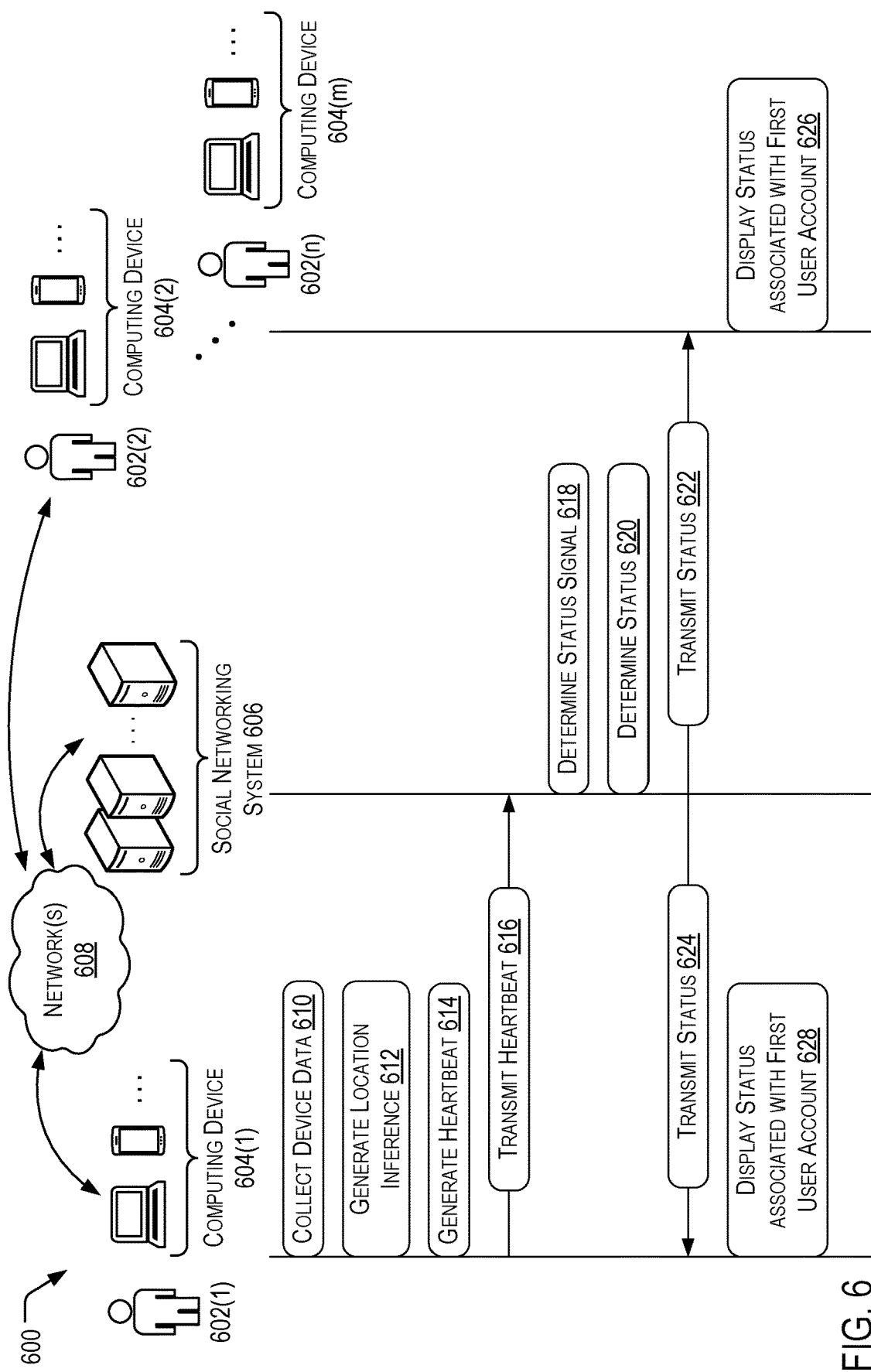
FIG. 6 is a schematic view of an example computing system usable to implement status update techniques described herein.

FIG. 6 is a schematic view of an example computing system 600 usable to implement example techniques described herein, such as providing updated status of one or more of the users, to facilitate users participating in a social network application and/or service via the system 600. In some examples, the system 600 may include users 602(1), 602(2), . . . 602(n) (collectively "users 602") to interact using computing devices 604(1), 604(2), . . . 604(m) (collectively "computing devices 604") with a social networking system 606 via a network 608. In this example, n and m are non-zero integers greater than 1.

Each of the computing devices 604 includes one or more processors and memory storing computer executable instructions to implement the functionality discussed herein attributable to the various computing devices. In some examples, the computing devices 604 may include desktop computers, laptop computers, tablet computers, mobile devices (e.g., smart phones or other cellular or mobile phones, mobile gaming devices, portable media devices, etc.), or other suitable computing devices. The computing devices 604 may execute one or more client applications, such as a web browser (e.g., Microsoft Windows Internet Explorer, Mozilla Firefox, Apple Safari, Google Chrome, Opera, etc.) or a native or special-purpose client application (e.g., social media applications, messaging applications, email applications, games, etc.), to access and view content over the network 608.

The network 608 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the computing devices 604 may access the social networking system 606 and/or communicate with one another.

The social networking system 606 may include one or more servers or other computing devices, any or all of which may include one or more processors and memory storing computer executable instructions to implement the functionality discussed herein attributable to the social networking system or digital platform. The social networking system 606 may enable its users 602 (such as persons or organizations) to interact with the social networking system 606 and with each other via the computing devices 604. The social networking system 606 may, with input from a user, create and store in the social networking system 606 a user account associated with the user. The user account may include demographic information, communication-channel information, and information on personal interests of the user. The social networking system 606 may also, with input from a user, create and store a record of relationships of the user with other users of the social networking system, as well as provide services (e.g., posts, comments, photo-sharing, messaging, tagging, mentioning of other users or entities, games, etc.) to facilitate social interaction between or among the users 602.

Additionally, FIG. 6 shows illustrative methods. These methods are described with reference to the example system of FIG. 6, but may also be used with the example systems of FIGS. 1 and 7. However, the methods described are not limited to being performed using the systems of FIGS. 1, 6, and 7 and may be implemented using systems and devices other than those described herein.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. Moreover, the methods described herein can be combined in whole or in part with each other or with other methods.

For example, the social networking system 606 may be configured to control which users 602 have access to services provided by the social networking system 606.

For example, at operation 610, the computing devices 604(1) may collect data from device sensors, data stores, other sources, or combinations thereof. For example, the data from the device may include accelerometer-based data, temperature data, barometric data, location information, optical data, or combinations thereof among others.

Additionally or alternatively, certain examples collect the data based on events detected and/or identified by the computing device 604(1). For example, a specified event or triggering event may cause a polling of the specified sensors and/or data stores to gather available status information and generate a data report, for example, a status heartbeat or simply heartbeat to be used to determine a status of the user via the user's device associated with a first account.

In certain examples the triggers occur at non-deterministic intervals while the application is in the foreground and/or the background of the device. Illustrative triggers may include one or more of a background fetch (e.g., ~1 fetch per 5 minutes), a received push notification, a geofence being broken (in some examples, geo fences may be placed around the computing device 604(1) at specified time or at all times to increase frequency of triggering events), a visit to a location (e.g., a CLVisit may be detected through an device's API when a user has been in a location for more than 5 minutes and when they leave, an application state change on the device (e.g., an application is in the foreground (e.g., foregrounded) or is in the background (e.g., backgrounded)), a significant location change is detected (e.g., an API for movement may return a value greater than a threshold value, for example, ~1 km), a change in a charge state of the device (e.g., a foreground only notification when the device has been plugged in or unplugged), a photo taken (e.g., a foreground only notification when the device has taken a photo), a wireless (e.g., WiFi) network changed (e.g., a foreground only notification when the device connects or disconnects from WiFi), or combinations thereof among others.

Additionally or alternatively, the triggering events may occur or trigger more frequently while the computing device is in motion and/or the application is in use.

In various examples events that are detected may be processed through an abstraction system to identify whether the events are triggering events that are considered in causing the device to collect data and generate a location update in preparation to generate and transmit a heartbeat.

Additionally or alternatively, in certain examples activity recognition may not always be available. As such, various examples contemplate that a status determination system may provide a status without relying on activity recognition to trigger collection of data and preparation of a heartbeat signal.

In certain implementations the event-based data gathering may increase the duration of the device's battery, for example, by avoiding a full data collection procedure when it is likely that the additional data would not result in a change in status.

Returning to FIG. 6, at operation 612, a location inference may be generated. For example, locations may provide different information for different users and for each user may help in providing a personal context information. For example, for example a personal context may include the user being at home, at work, at school, or away from them or from the region that includes them. Here, a status signal that may be included in the heartbeat is whether the current location is relevant to the particular user. This signal may be called a location inference. Because the methodologies for inferring the importance of a location generally require some level of location history retention and the system strives to limit and often disallow server-based signal retention, the location inference signal may be a client-based signal. In some examples, the inferred locations themselves will not be transmitted to the server. Rather, in those examples, the client may transmit an inferred location category as a signal. For example, the inferred location may be a first predetermined location, a second predetermined location, a first predetermined region, or combinations thereof among others. An embodiment may provide that the first predetermined location is a "primary" location, where for example, the user spends their night times. The second predetermined location is a "secondary" location where, for example, the user spends their weekday day times. The first predetermined region may is "away" where the location may be a location greater than a threshold distance from the primary or secondary locations. For example, the threshold distance may be 10, 50, 75, 100, 200, or more miles from the user's primary location that is not the secondary location. Additionally, the system may identify the location as fitting none of the other categories and may return a null with no location inference for the location.

In various examples, the primary location will be assumed to be the user's home location. The secondary location may be combined with user and location context by the status engine to determine if it is a place of work or school. The away location may be combined with location context to power statuses related to traveling.

In some examples, the system may prompt the user for their primary and secondary addresses for use in training one or more models. For example, various methodologies may be used for automatically inferring the user's primary and secondary locations while using the explicit locations to validate the models. Additionally or alternatively, a fully automatic inference model may be used and explicit prompting may be disabled, removed, or not included in the model.

Various embodiments contemplate that a location inference may apply multiple segments.

For example, an example may use two steps, including visit segmentation where the system detects or determines whether the user is currently stationary or moving, and routine place detection, where the system detects whether the user is currently at home/work.

Illustrative Visit Segmentation

On some operating platforms, the operating system may provide some useful data. For example, the operating system may provide visit level events (e.g. visit started, visit ended). Here, a user is considered stationary when in a visit state, and moving when out of a visit state.

Additionally or alternatively, a heuristic may be implemented based on location updates to identify whether the device is stationary or moving. The heuristic may include that a device is considered stationary if the location updates are close to each other (<150 m) for more than 2.5 minutes. When the device is considered stationary, an aggregate of location updates received while stationary may create or be used as a visit centroid. The device may be considered moving when a location update is more than a threshold distance from the current visit centroid, for example, greater than 100 yards, 100 m, 200 yards, 200 m, or greater.

Illustrative Visit History

In various examples visit segments are stored persistently on the client, for a maximum duration of a set number of days, for example 1 week, 1 month, 6 months, 1 year, 18 months, 2 years, or longer. The persisted information may include a visit state (e.g., stationary/moving), a start time, an end time, the device time zone at the moment the visit is ended, a location (visit centroid), among others.

Illustrative Routine Place Detection

In various examples a routine place detection may include multiple steps. For example two steps may include determining the primary/secondary locations of a user, and detecting whether the user is currently at a primary or secondary location.

For example, determining primary/secondary locations may include inferring the primary (home) and secondary (work or school) locations of a user. This may be completed by periodically aggregating the visit history.

The following is an illustrative detection algorithm:
Aggregate all visits into clusters based on their proximity (e.g., 200 m);
Label clusters as primary or secondary based on the following rules:
  Primary (home):
    Compute the total night time spent between midnight and 6 am in the visit cluster
    That total time spent at night must be greater than ⅓ of the total night time of the visit history.
  Secondary (work/school)
    Compute the total time spent between 10 am and 4 pm, between Mon-Fri
    That total time spent must be greater than ⅓ of the total working hours in the visit history.

Additionally or alternatively, after clustering the visit determinations based on proximity to each other, the system may determine a first predetermined location based at least in part on a cluster representing a first determined amount of time spent during a first portion of a day. Here, the first portion of the day may be associated with a first range of times, for example, in the evening, at night, or early in the morning. Additionally, the system may determine a second predetermined location based at least in part on a cluster representing a second determined amount of time spent during a second portion of the day. Here, the second portion of the day may be associated a second range of times, for example, during traditional working and/or school hours, during a weekday as opposed to a weekend. Here, the first portion of a day and the second portion of a day are different.

In various examples the algorithm allows for multiple primary/secondary locations. Further, once the primary and secondary locations are found, they may be persisted on the client.

Additionally or alternatively, the system may detect users' current routine place. For example, given the primary/ secondary locations detected at the first step, a user may be considered to be at the primary or secondary location when the user is currently stationary—based on the visit segmentation algorithms above if the current location with within a threshold distance of a primary/secondary location, for example, within 100 yards, 100 m, 200 yards, 200 m, 300 m, or greater. In some examples, home takes prevalence over work in case both are within a threshold distance of each other, for example within 200 meters.

Additionally or alternatively, the system may detect a user's away status where a user is considered away if the current location is further than a threshold distance (e.g., greater than 10, 50, 75, 100, 200 miles, or greater) from a routine place (e.g., primary or secondary).

Additionally or alternatively, the system may implement techniques to preserve resources. For example, the system may limit activities that determined to be principal contributors to draining a devices power sources, for example batteries.

Illustrative activities that contribute to battery drain may include frequent network access, as such the system may cause the client to avoid, as much as practicable, to wake up the radio to send heartbeat requests. One technique may include using the upload logic described further herein and includes precomputing the status on the client and sending a heartbeat to the server upon changes in the status only. Other techniques include opportunistic uploads based on existing network activity in the application. For example, if the application is going to wake up the radio for other purposes, the system may make use of the opportunity to send a heartbeat.

Another illustrative activity may include frequent location access where frequent location collection causes an undue drain. However, the technique may use location collection interval of a threshold time. For example, an interval between 1 and 2 minutes on some operating systems may be a desirable balance between battery usage and updated location information.

Another illustrative activity may include activity recognition where frequent activity recognition processes cause an undue drain. However, the technique may use an activity recognition interval threshold time, where the operating system uses the threshold as a minimum collection interval, but may also send activity recognition updates at a shorter interval, when for example, a change of state is detected. An example of an activity recognition interval threshold time may be an interval of 6 to 15 minutes, 8 to 10 minutes, 8 to 12 minutes, or 10-15 minutes, among others.

Illustrative Heartbeat Configurations and Techniques

Returning to FIG. 6, at operation 614, a heartbeat may be generated. For example, the client computing device may compute a local status model based on its available signals. The signals may include an inferred location (e.g., primary, secondary, away, null), a visit state (e.g., moving or stationary), and/or an activity (e.g., driving, biking, walking, stationary).

Additionally or alternatively, upon a change of this model, the client generates a heartbeat with the latest signals, and send or transmit, for example at operation 616, the heartbeat to the social networking system 606, for example through network 608.

Additionally or alternatively, an effect of this technique is that for the client to push an update as soon as the user arrives or depart from a place or the method of motion changes.

In some examples, the detection algorithm may apply various clustering techniques to the detected visits. For example, a density-based spatial clustering of applications with noise (DBSCAN) technique may be used to divide the detected visits into clusters which the algorithm may further evaluate. In this example, the spatial distances between detected visits may be used to assign a visit to a cluster of other visits that are close to each other spatially.

Illustrative Heartbeat

Additionally or alternatively, in some examples the heartbeat may include data available on the computing device and useable in generating a status. For example, the following is an illustrative pseudo code outlining an illustrative heartbeat where fields are optional/nullable:

```
{
    "inferred_location": "primary", // "primary", "secondary",
    "away_near", "away_far
    "latitude": "31.45235",
    "longitude": "178.6529",
    "location_accuracy": "103.45" // meters
    "is_visiting": "false", // whether or not the client's state is in a visit
    "speed": "2.51", // in m/s
    "battery_level": "0.73",
    "is_charging": "true",
    "wifi_connected": "true",
    "ssid": "guest",
    "bssid": "ad:13:e3:c7:65:0f"
    "activity_type": "walking", // "stationary", "walking", "running",
    "driving", "eye
    "activity_confidence": "0.25" // 0 - 1
}
```

Illustrative Status Collection Control

Privacy and control over one's privacy is important while interacting over the internet as well as interacting over social media. As such, the system may allow a user to turn on or turn off automatic status data collection. Additionally, some examples allow this capability even without a network connection on the computing device.

Additionally or alternatively, to hide statuses from the select contacts, for example, a user's close friends, as soon as possible after a toggle-off, in the some examples the server may expose toggle-on and toggle-off API endpoints that clients should best-effort attempt to hit when the toggle gets switched off, and must hit at some point after the toggle has been switched on. For example, in some examples, engaging the toggle-off endpoint will hide the user's current statuses and, prevent future heartbeats from creating new statuses. For example, this may apply in a case where an HTTP request was already in-flight from a background task on the client with status data from before the toggle-off. Engaging the toggle-on endpoint will unhide the user's current statuses and allow heartbeats to create statuses again. In various examples, if a user turns automatic status off and keeps it off, all of the user's statuses may be hard-deleted from the social media servers within a threshold period, for example, 30 days, in addition to being hidden immediately.

Additionally or alternatively, in some examples the clients must engage the toggle-on endpoint for the server to accept status heartbeats; otherwise, all heartbeats may be discarded and no automatic statuses will be created. If there's no network connection at the time the toggle is switched on, the API request may be done whenever a network connection is restored, so that clients can begin collecting data immediately (e.g., activity data) without requiring a network connection. Additionally, since there's an unpredictable amount of lag time from beginning to subscribe to certain data from the operating system and when the operating system actually calls the application back with the data, from a user experience perspective it may be desirable to subscribe locally as soon as possible in order to show relevant statuses to a user's select contacts as soon as possible after the user enables the feature.

FIG. 6 also shows, at operation 618, the social networking system 606 may determine status signals. For example, the system may use the status signal information received in the heartbeat and combine it with additional status signal information to determine a status. For example, additional status signals may be gathered and or created by the system. For example, the system may determine or receive a user context, a location context, and/or weather information among others.

At operation 620, the social networking system 606 may determine a status of the user. For example, the status may be based on the status signals from either the heartbeat or as determined by the system or both.

Various examples contemplate using the social networking system 606 to determine the status when compared to determining the status at a client device, the scalability and computing power of the system may enable additional flexibility and product improvements.

However, as privacy and control over one's privacy is important, various examples will not keep a permanent record of any status signals on the server. Rather, for example, the status signals will be used to derive a status and then discarded. Any status signal that needs to be cached to support the feature will be done so on the client and will be deletable by the user (e.g. uninstalling the app).

Once the status is determined at operation 620, at operation 622, the system may send or transmit the status to one or more select contacts of the user. For example, the social networking system 606 may transmit the status to computing device 604(2) over network 608. Here, computing device 604(2) may be associated with user 602(2) and a select user account. In this example, user 602(1) designated the user account associated with user 602(2) as a select user account. This designation by user 602(1) may indicate a close relationship between user 602(1) and user 601(2) and an interest in sharing status information of user 602(1) with user 601(2) through the social networking system 606 via the user account associated with user 601(2).

Additionally or alternatively, the system may also send the status to computing device 604(1) at operation 624. This may enable the user 602(1) to be aware of the status that the system is broadcasting.

Depending on the status and configuration of computing device 604(2), at operation 626, the system may display the status associated with the first user account for example, the account associated with user 602(1) and computing device 604(1). Additionally or alternatively, depending on the status and configuration of computing device 604(1), at operation 628, the system may display the status associated with the first user account for example, the account associated with user 602(1) and computing device 604(1).

Figure 7:
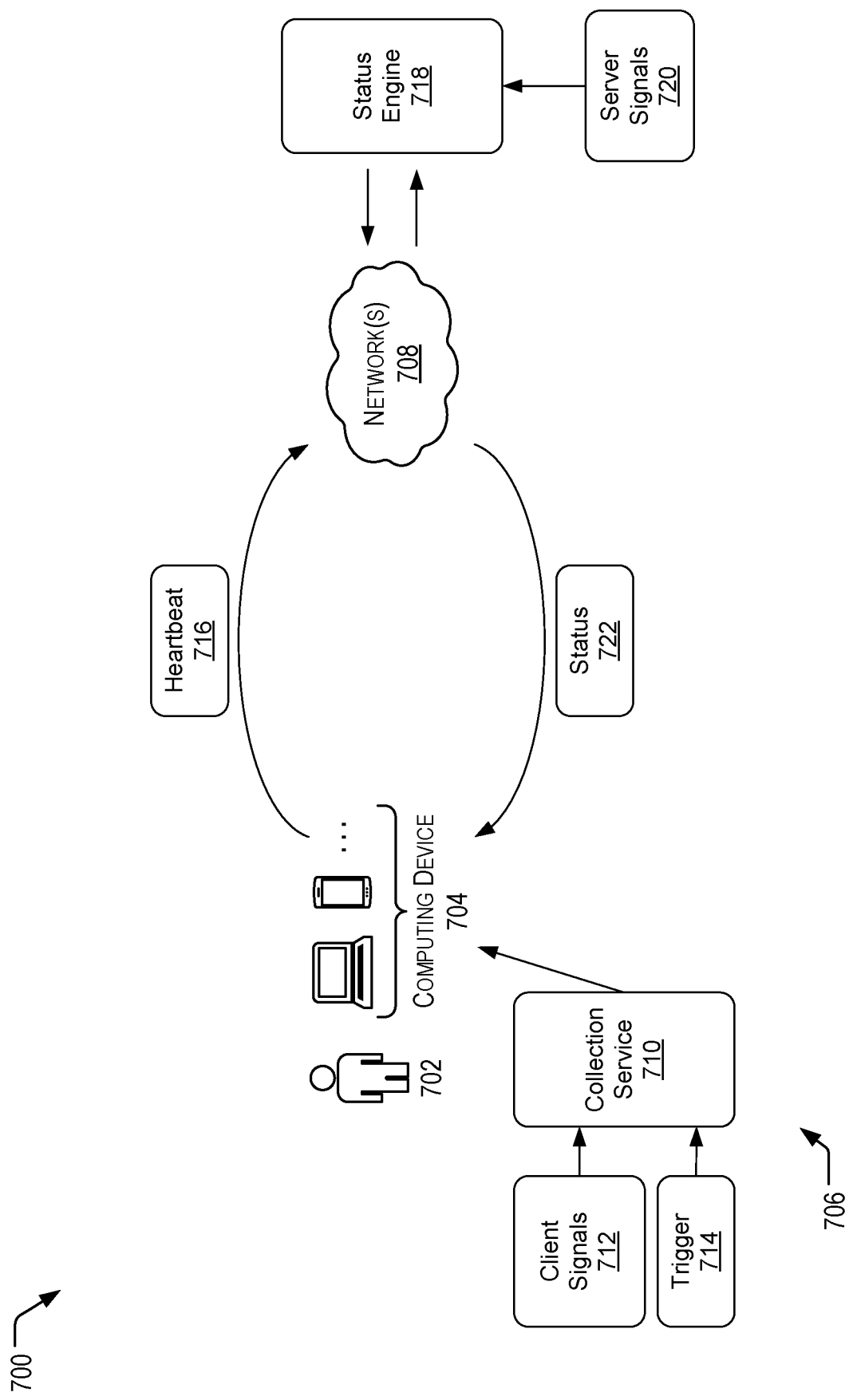
FIG. 7 is a schematic view of an example status system usable to implement techniques described herein.

FIG. 7 is a schematic view of an example of a status system 700. For example, status system 700 may include a user 702 that may have a computing device 704 associated with a user account and operating application 706 and may communicate over a network 708. Application 706 may include a collection service 710 that may request and receive data from sensors on the computing device 704 through client signals 712. Further, collection service 710 may be in communication with and receive triggering events from trigger 714. For example, the computing device 704 may encounter and detect a triggering event causing the computing device 704 to generate a heartbeat 716 and transmit it to a status engine 718. In some examples the status engine 718 may reside on a remote computing device or devices, for example a server. Additionally or alternatively, the status engine 718 may receive information from a server or other data sources, for example, in the form of server signals 720. The status engine may use the server signals 720 and heartbeat 716 to generate a status 722. In some examples the system may transmit the status 722 back to computing device 704 as well as other computing devices associated with user accounts that user 702 has previously selected or designated to receive the status 722.

Figure 8B:
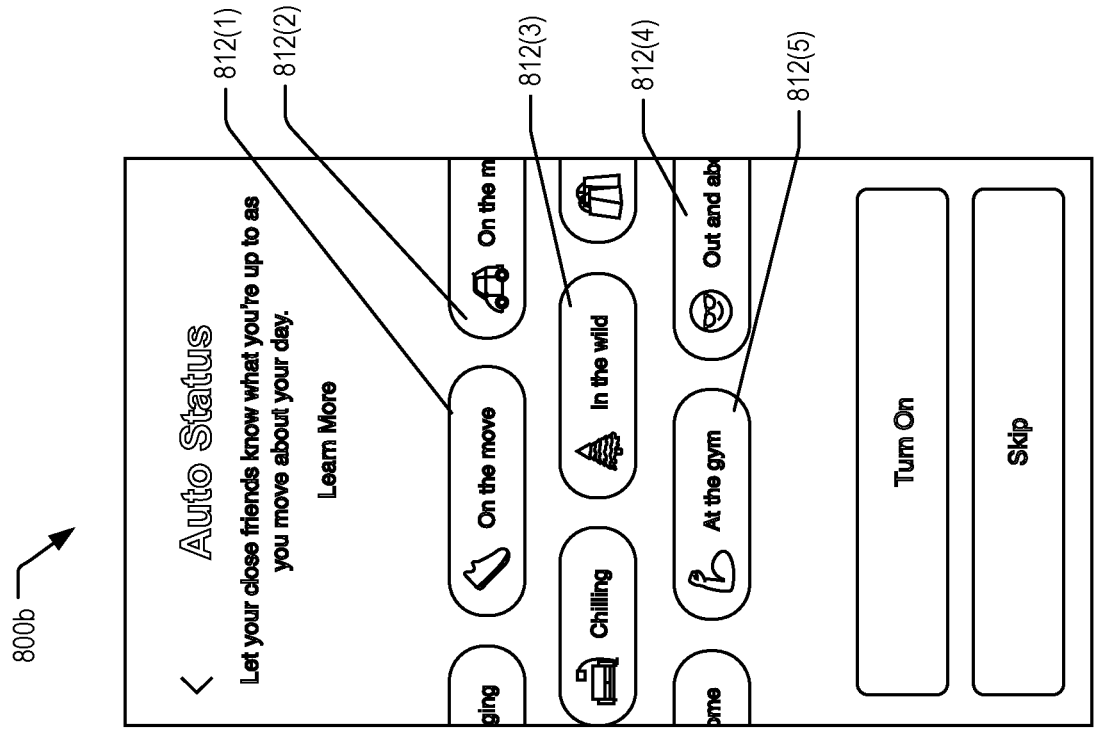
FIG. 8B shows an example user interface to control automatic status determinations.
Figure 8A:
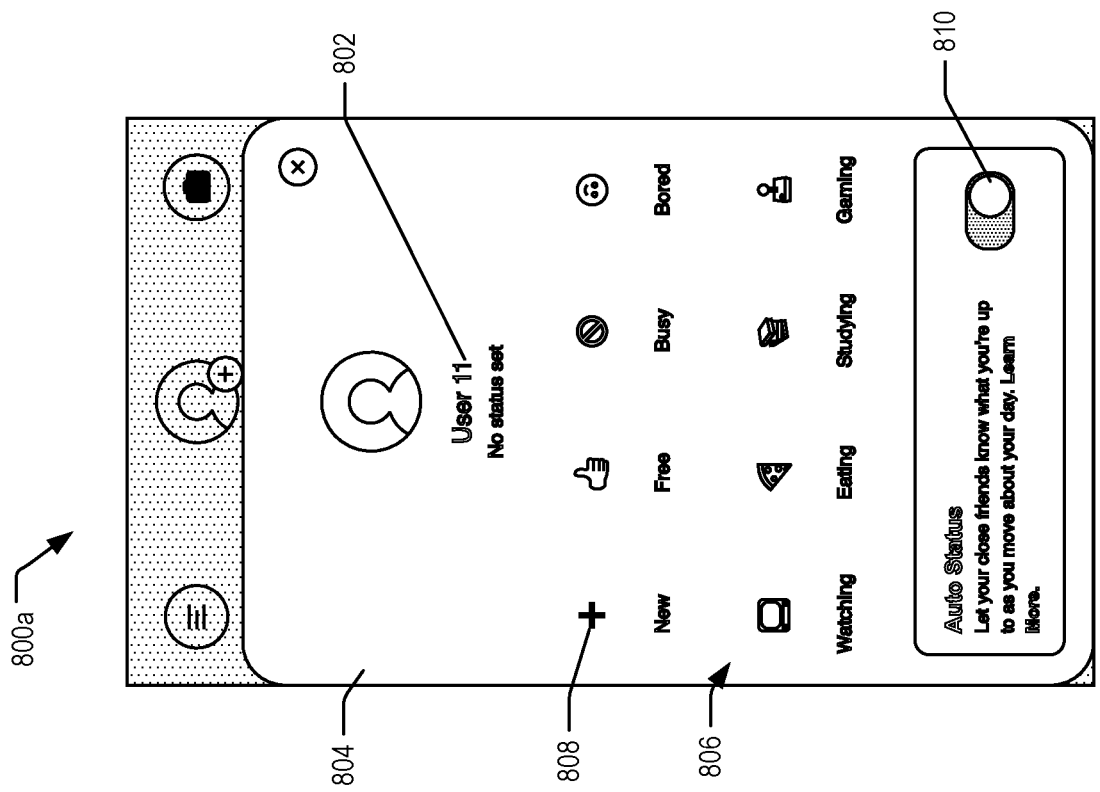
FIG. 8A shows an example user interface to set a status for a user.

FIG. 8A shows an illustrative user interface 800a allowing selection of a status of a user associated with the user account 802 on the device. For example, user interface 800a shows a menu 804 where a user may select a manual status from a list 806 of statuses or create a new status through control 808. Additionally or alternatively, the user may enable automatic status determination by selecting control 810.

FIG. 8B shows a display 800b with illustrative statuses 812(1)-(5) that may be displayed on a computing device to indicate a status associated with a user's account. For example, a status may include one or more of text, a symbol, an image, or combinations thereof among others. For example, a symbol may include an emoji or emoticon among others. Additionally, an image may include a sticker in some examples.

Various techniques are described with reference to the example systems of FIGS. 1, 6, and/or 7 for convenience and ease of understanding. However, the methods described are not limited to being performed using the systems of FIGS. 1, 6, and/or 7 and may be implemented using systems and devices other than those described herein.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. Moreover, the methods described herein can be combined in whole or in part with each other or with other methods.

Figure 9:
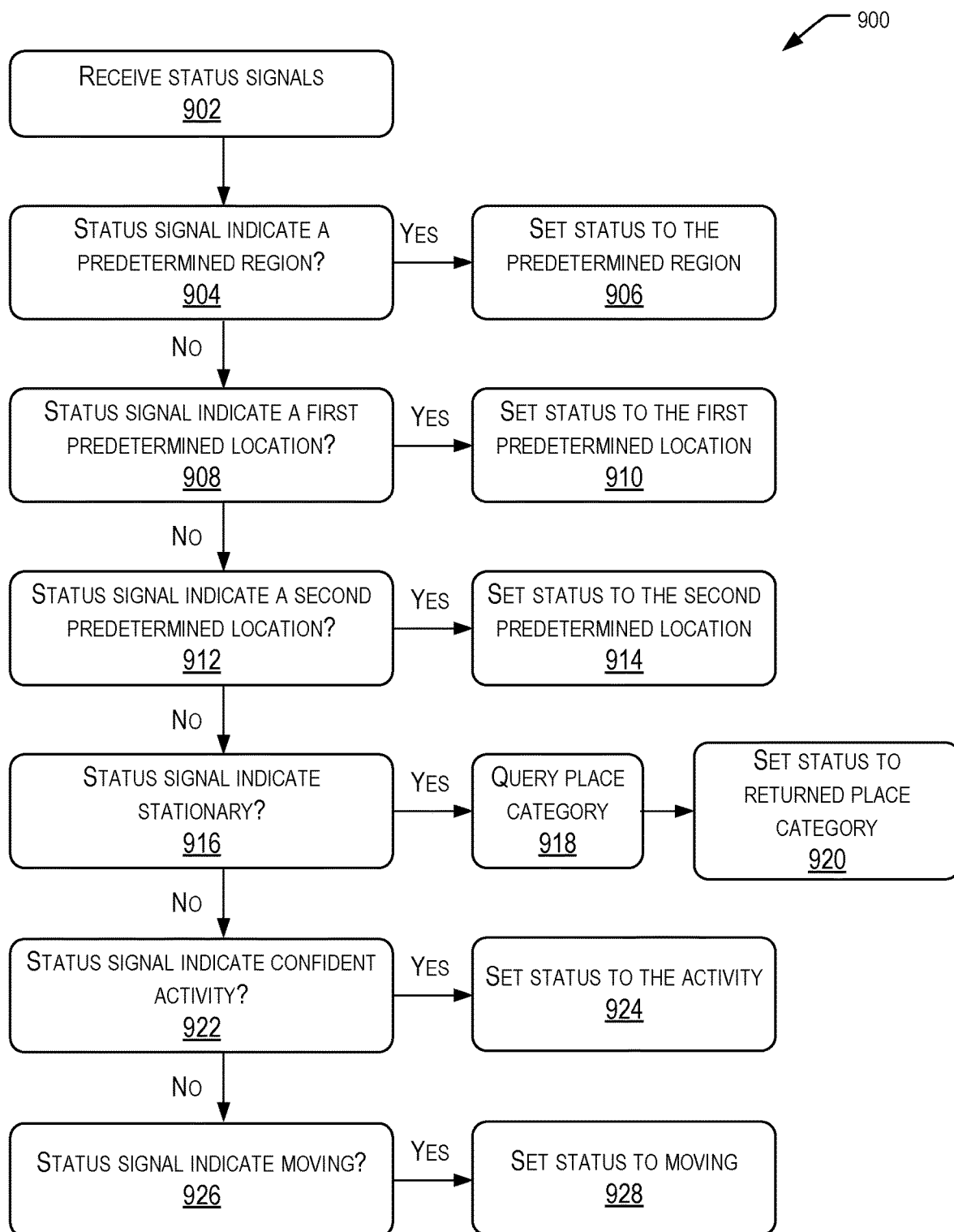
FIG. 9 is a flowchart showing example status determination and setting techniques.
Figure 10:
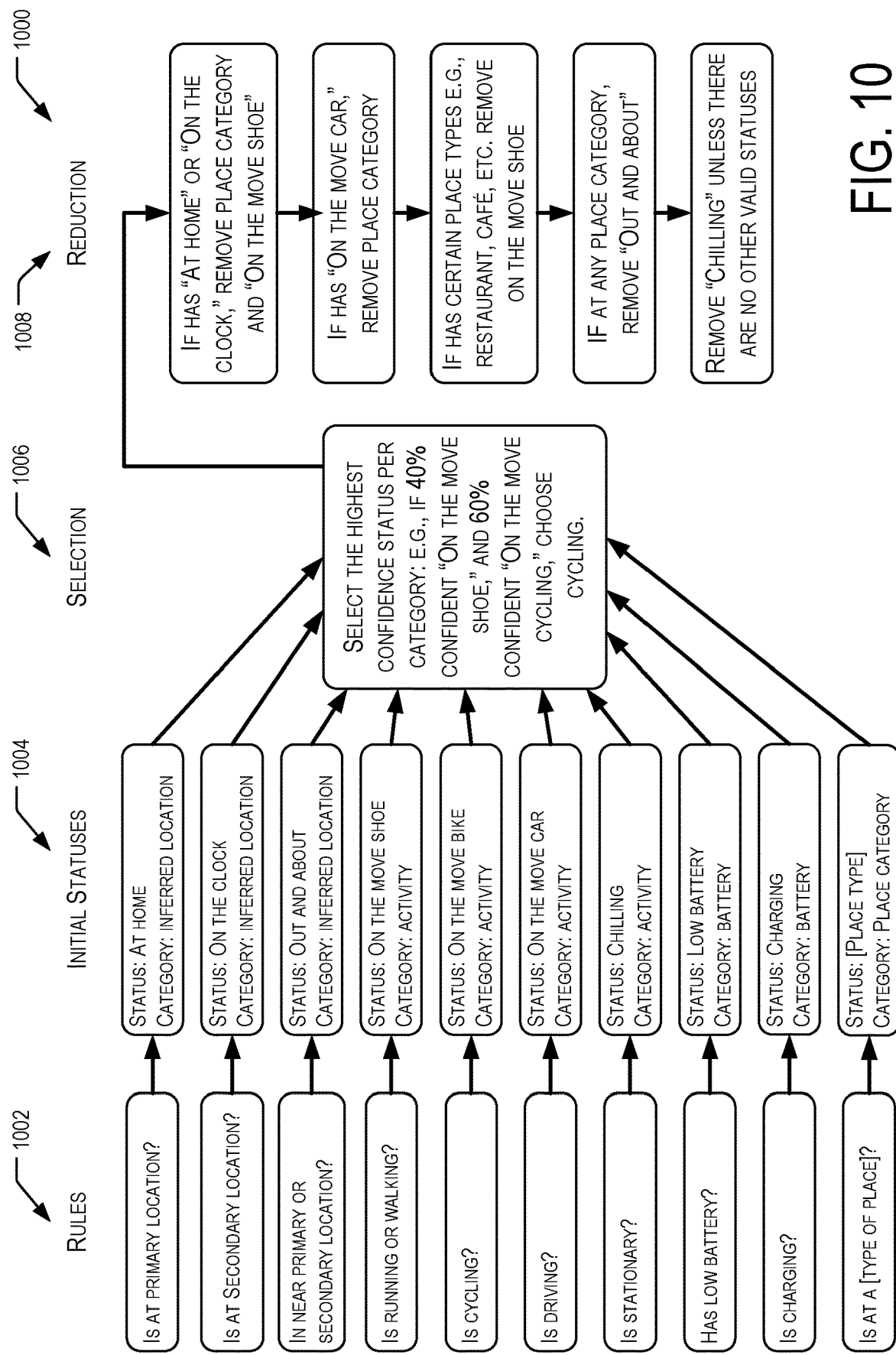
FIG. 10 is a schematic diagram of an example status determination engine.

FIGS. 9 and 10 show illustrative examples of status engines. For example, FIG. 9 shows a status engine 900. For example, at 902 status engine 900 may receive status signals, for example from a heartbeat provided by a user device associated with a user account or, for example, from another status signal source such as a network service.

In this example, at 904, the status engine 718 checks whether the status signal indicates a predetermined region. If yes, at 906, the status is set to the predetermined region. For example, the region may be away from a predetermined location by a threshold distance.

If no, at 908, the status engine checks whether the status signal indicates a first predetermined location, for example, a primary location, for example a location associated with the user's home. If yes, at 910, the status is set to the predetermined location.

If no, at 912 the status engine checks whether the status signal indicates a second predetermined location, for example, secondary location, for example a work location or school location associated with the user. If yes, at 914 the status is set to the second predetermined location.

If no, at 916 the status engine checks whether the status signal indicates that the device is stationary. If yes, at 918 the system may query a place category system to determine a place category associated with the stationary location. At 920, the status is set to the place category.

If no, at 922 the status engine checks whether the status signal indicates a confident level of activity. If yes, at 924 the status is set to the activity.

If no, at 926 the status engine checks whether the status signal indicates that the device is moving. If yes, at 928 the status is set to moving or on the move.

FIG. 10 shows another illustrative example of a status engine 1000. For example, status engine 1000 may apply one or more rules 1002 to initial status information 1004. For example, the initial status information 1004 may include a status and an associated category.

The status engine 1000 may then evaluate the results of the rules 1002 applied to the status information 1004 in selection process 1006. For example, selection process 1006 may select the highest confidence status per category. For example, if a confidence level of 40% is returned that a first status or status indicator combination is correct and a confidence level of 60% is returned that a second status or status indicator combination is correct, then the second status or status indicator may be selected.

Additionally or alternatively, the status engine 1000 may further apply a reduction process 1008 to choose a category of the categories returned from selection process 1006. For example, if the returned categories include "at home" or "on the clock," a first predetermined or second predetermined location may be indicated. As such, the reduction process 1008 may remove the place category and "on the move." If the remaining categories include "on the move car" then the place category may be removed. If the remaining categories include certain place types (e.g., a restaurant, café, etc.) then the system may remove "on the move." If the remaining categories include any place categories, then the system may remove "out and about." Further, the system may remove "chilling" unless there are no other valid statuses remaining.

Additionally or alternatively, in some examples the status associated with a user's account may be set manually, for example, by the user, automatically, for example, by the social network system, or combinations thereof. For example, a user may identify a first select group of select contacts and may specify a first range of or limited set of statuses that may be sent to that group. Additionally, the use may specify a second select group of contacts and may specify a second range of or limited set of statuses that may be sent to that group. Here, the first and second select groups may be different, mutually exclusive, the same, or have some overlaps.

Additionally or alternatively, the user may specify a rotation of statuses that may be sent to a select group of contacts. For example, a user may specify that while at a primary or secondary location, the status may rotate between several status, including for example, "chilling," "reading," "studying," "cooking" among others.

While various specific status designations are provided throughout this application (e.g., "at home," "on the clock," "on the move," etc.), other status designations may be used to designate the same, similar, or different actions and/or locations of the user. For example, a status may include one or more of text, a symbol, an image, or combinations thereof among others. For example, a symbol may include an emoji or emoticon among others. Additionally, an image may include a sticker.

Illustrative Notification Systems and Techniques

In certain configurations, two or more services and/or two or more applications may be installed on a user's device suitable for sending and/or receiving a message or content to or from another user. As discussed elsewhere in this disclosure, there may be benefits to using the two applications, for example, to streamline communication with the different contacts in one's network. As such, the techniques described herein also improve performance of one or more computing devices by reducing an amount of content sent over a network. For instance, by providing users a with a streamlined application or interface, users are able to share information much more quickly and easily than using existing platforms. Additionally, by only sending notifications and updating badging associated with a message from a contact in one location (e.g., via one application or service), the social network system can reduce the number of notifications and/or badge update messages sent. In this way, the quantity of data sent over the network may be reduced and an amount of electricity consumed by the user's device to receive these messages may be reduced. Additionally, by coordinating the presentation of notifications and badge updates, the number of notifications presented on the user's device can be reduced avoiding redundancy and further reducing the amount of electricity consumed by the user's device to display the notifications and/or badge updates.

However, depending on the operating system, a streamlined implementation may face certain challenges. For example, some operating systems prevent, in many cases, applications from interacting with each other, commonly referred to as "sand boxing" the applications. In these situations, it may be beneficial to implement a notification and badging system at a level above a user's device, for example, at a server or service level. Additionally or alternatively, some operating systems do allow two or more applications installed on a device to interact with each other. In these examples, it may be beneficial to allow a client-side service to handle how the notifications are coordinated and presented to a user via one or more user devices.

For example, a server may determine whether the receiving user account associated with a message has a first and second application installed on the device where both are useable to share the message and content between the receiving user account and the sending user account. The server may also identify what type of operating system is installed on the receiving device to determine whether a notification or badge update and routing should be determined at the server level or passed to the client-side handler.

Additionally, when the system determines that the notification or badge update and routing should be determined at the server level, the system may also identify whether one of the two or more applications is in the foreground of the user device. For example, the user device may provide a user presence status associated with an application when communicating with the server. In that example, a user presence status of active associated with a first application may indicated that the associated first application is the foreground of the user's device. Conversely, a user presence status of inactive or null associated with the first application may indicate that the first application is not in the foreground of the user's device. Depending on the device and operating system, only one application is considered in the foreground. In some examples, an application being in the foreground means that the application is one or more of being used or interacted with by the user, assigned a priority by the operating system, or combinations thereof. In that example, an active status on a first application may indicate that a second application is not in the foreground of the user device. However, as devices increase in power and capabilities and user interfaces evolve, a device may provide for multiple application to effectively be in the foreground of the device.

Figure 11:
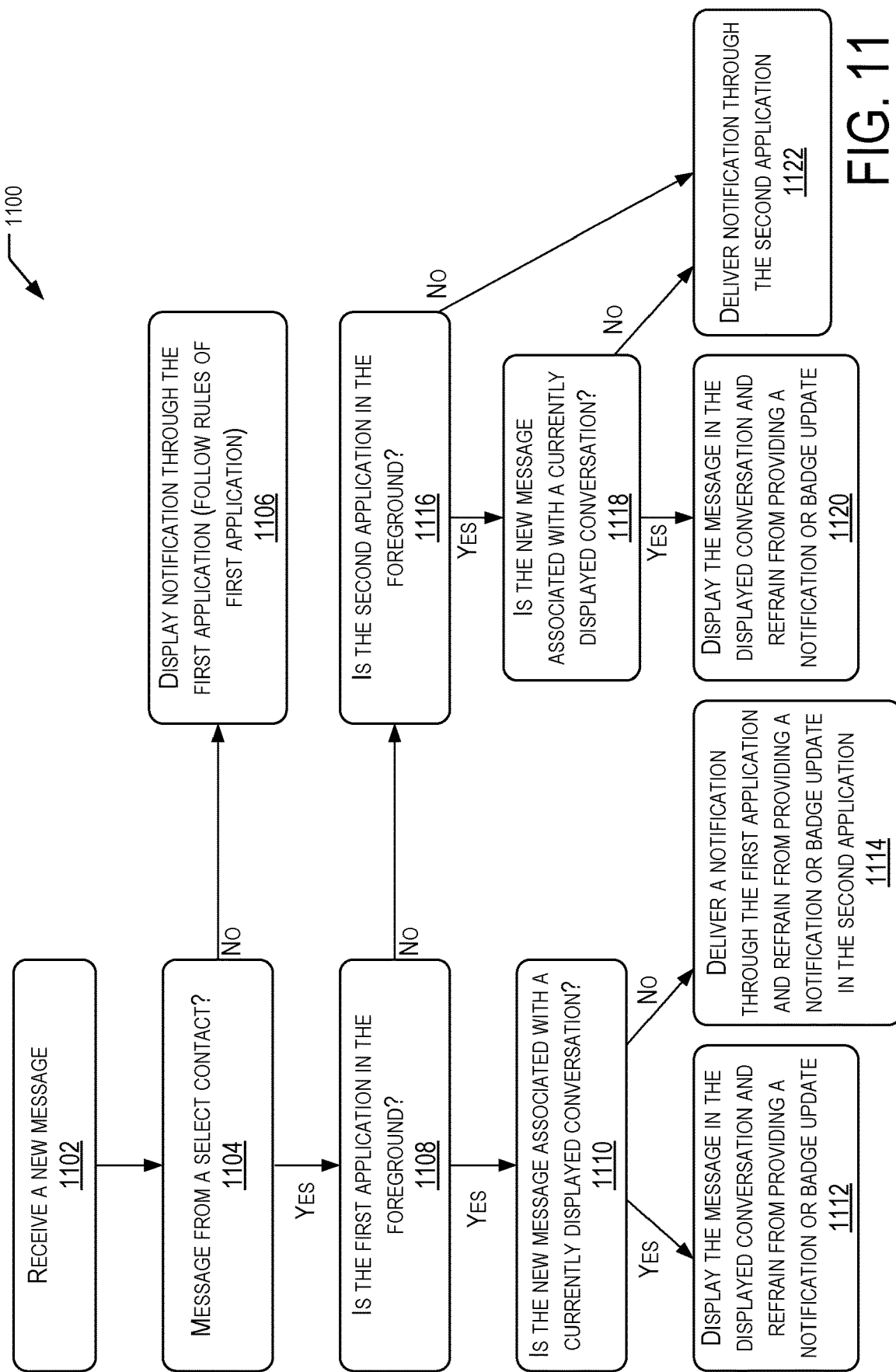
FIG. 11 is a flowchart showing example notification techniques.

FIG. 11 shows a view of an illustrative push notification system 1100. For example, push notification system 1100 may receive a message addressed to a first user account at 1102 associated with a user device. The message may be sharable through a first application and second application installed on the user device. Here the message may be considered as being sent from a second user account. At 1104, the system may determine whether the second user account is associated with a select contact as designated by a first user associated with the first user account. In this example, the first user may designate that, when appropriate, the first user will receive messages from the second user account through a second application. If no, then at 1106, the message may be processed according to a first application's rules. This may include generating a notification associated with the message and delivering the notification via the first application.

If yes, at 1108 the system may determine whether the first application is in the foreground of a user device associated with the first user account. If yes, at 1110 the system determines whether the new message is associated with a conversation currently displayed on the user device. If yes, at 1112, the system may deliver the new message to the user device through the first application and may refrain from generating or providing a notification or badge update associated with the new message on the first application or second application. If the message isn't associated with a currently displayed conversation, then at 1114, the system may deliver a notification though the first application and refrain from providing a notification or badge update in or through the second application.

At 1108, if the system determines that the first application is not in the foreground of the device, at 1116, the system determines whether the second application is in the foreground of the device. If yes, at 1118, the system determines whether the new message is associated with a currently displayed conversation. If yes, at 1120, the system may deliver the new message to the user device through the second application and may refrain from generating or providing a notification or badge update associated with the new message on the first application or second application. If the message isn't associated with a currently displayed conversation, then at 1122, the system may deliver a notification though the second application and refrain from providing a notification or badge update in or through the first application based on the new message.

If at 1116, the system determines that the second application is not in the foreground of the device, then at 1122, the system may deliver a notification though the second application and refrain from providing a notification or badge update in or through the first application based on the new message.

Depending on the specific examples, the push notification system 1100 may operate at one or multiple levels. For example, some of the operations may take place at a server level while some operations may take place at a device level while other operations may take place at either. For example, in one example operation 1104 may take place at a server, while in other examples, operation 1104 may take place at a user's device. Additionally or alternatively, an example may provide for operations 1104 and 1108 to take place at a server, while operations 1110-1114 to take place on the user's device. Additionally or alternatively, an example may have operations 1104-1110 take place at a server and 1112 or 1114 take place at the user's device. These are merely a small subset of illustrative examples.

Figure 12:
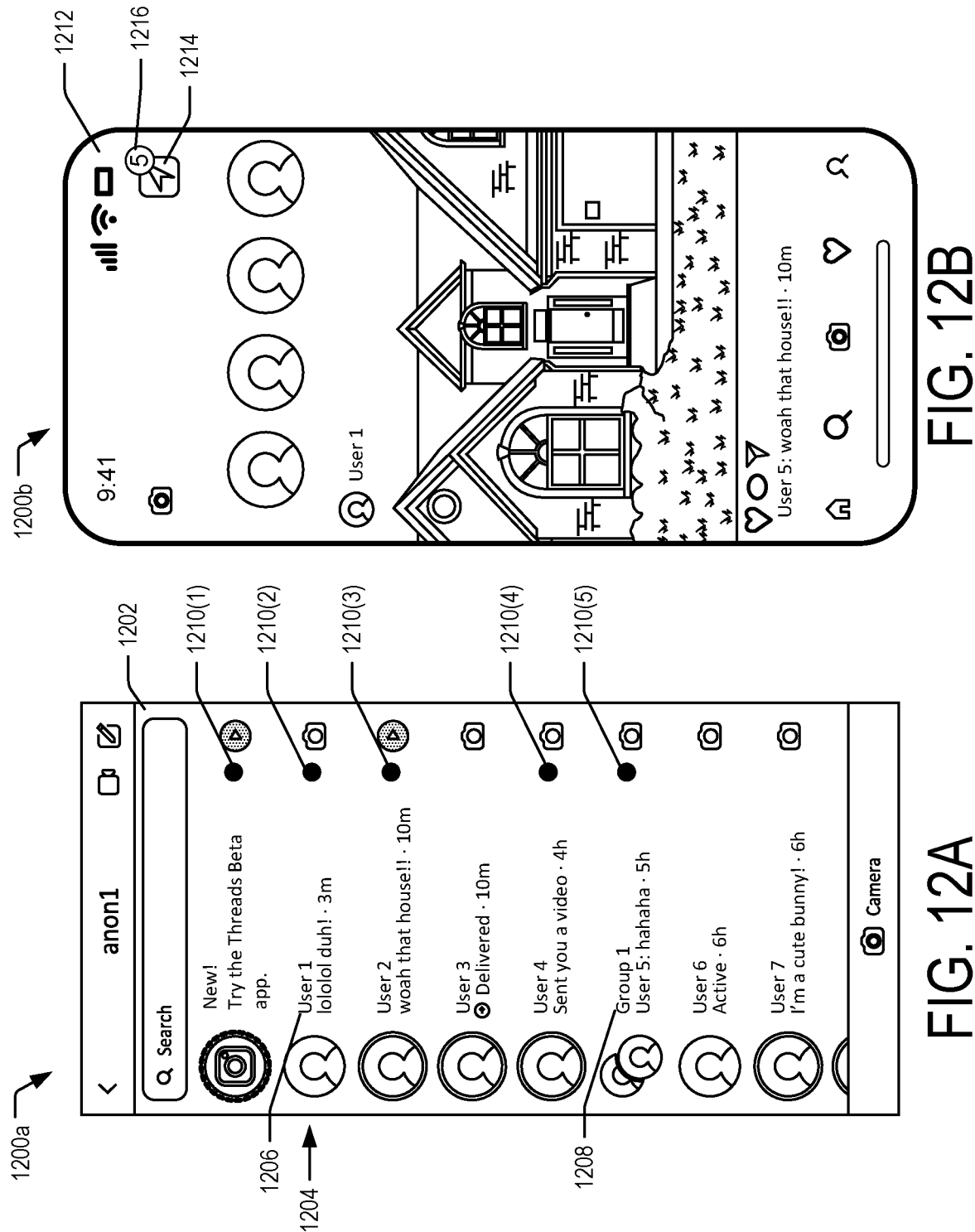
FIGS. 12A and 12B are schematic diagrams showing user interfaces with example notifications and badging.

FIGS. 12A-B show illustrative examples of a user interfaces 1200a and 1200b displaying illustrative notifications and badging associated with a first application of a push notification system, for example, the push notification system of FIG. 11.

For example, FIG. 12A shows user interface 1200a with a message inbox 1202 of a user displayed. The message inbox 1202 may include conversations 1204 associated with a contact 1206 or a group of contacts 1208. The message inbox 1202 may also include notification(s) 1210(1)-(5) of new messages associated with conversations. Notification(s) 1210(1)-(5) may include a distinct shape or color to allow a user to readily see that a new message has been received and not yet read, opened, or viewed.

FIG. 12B shows another user interface 1200b with a main application page 1212 displayed. Main application page 1212 includes an icon 1214. Icon 1214 may provide a control to access another page or feature of the application. For example, selection of icon 1214 may cause the device to display the message inbox 1202 of FIG. 12A. Icon 1214 may also display a notification indicator, for example, badge 1216 that indicates one or more unread messages or unviewed content. Badge 1216, may also indicate a number of unread messages or a number of conversations with unread or unviewed content.

Figure 13:
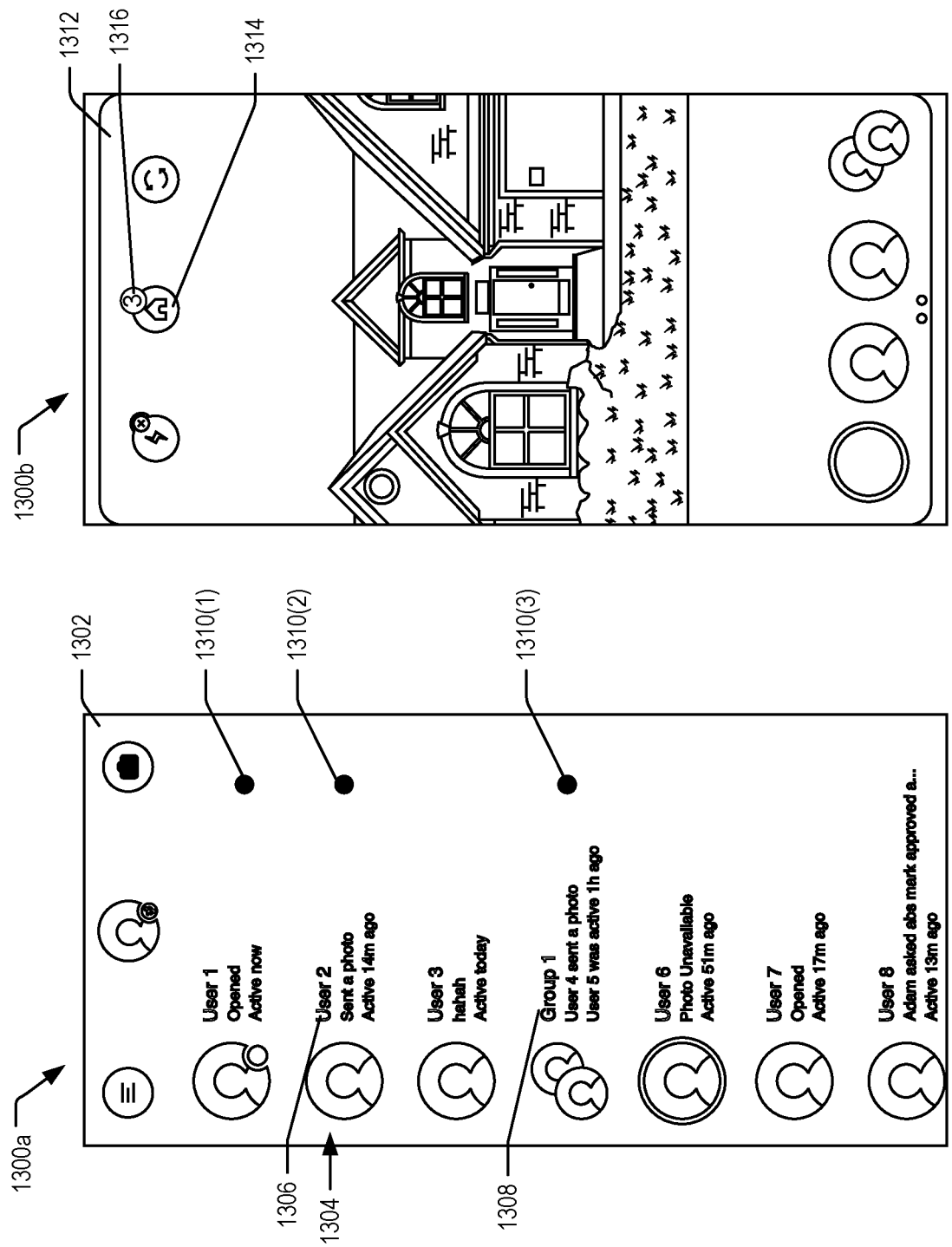
FIGS. 13A and 13B are schematic diagrams showing additional user interfaces with example notifications and badging.

FIGS. 13A-B show illustrative examples of a user interface 1300a displaying illustrative notifications and badging associated with a second application of a push notification system, for example, the push notification system of FIG. 11.

For example, FIG. 13A shows user interface 1300a with a message inbox 1302 of a user displayed. The message inbox 1302 may include conversations 1304 associated with a contact 1306 or a group of contacts 1308. The message inbox 1302 may also include notification(s) 1310(1)-(3) of new messages associated with conversations. Notification(s) 1310(1)-(3) may include a distinct shape or color to allow a user to readily see that a new message has been received and not yet read, opened, or viewed. Additionally or alternatively, the notification(s) 1310(1)-(3) may include a different shading, background, font size, font style, or combinations thereof among others when compared to conversations that do not have unread messages or unviewed content.

FIG. 13B shows another user interface 1300b with a main application page 1312 displayed. Main application page 1312 includes an icon 1314. Icon 1314 may provide a control to access another page or feature of the application. For example, selection of icon 1314 may cause the device to display the message inbox 1302 of FIG. 13A. Icon 1314 may also display a notification indicator, for example, badge 1316 that indicates one or more unread messages or unviewed content. Badge 1316 may also indicate a number of unread messages or a number of conversations with unread or unviewed content.

Illustrative Badging Systems and Techniques

Often, devices with multiple applications installed will provide an application icon that a user may select to open the respective application or bring the application into the foreground of the device. Some applications provide badging as part of the application icon to provide information to the user. For example, a badge that appears with/as part of/above/behind the application icon may provide some information to the user without the user having to select the application icon. For example, a badge may indicate that new content, a feature, or an alert, among others, is available in the application.

While badging can often be integrated into a notification system, where when a notification of a new message is pushed to a client, an updated badge or badge count or badge delta may be sent along with the push notification. However, when two or more applications are installed on a device where both applications are useable to share content between users, depending on the operating system and what the user is doing at the time the notification is sent to the device, may cause one or more of the badges to be out of sync with the underlying message count.

Rather than pushing a badge count update in every situation which might cause redundant or unnecessary updating and consequently wasting resources, these techniques strive to reduce or minimize unnecessary or wasteful updating.

Often an application badge count updates if one of the following occurs: the application is awake/in the foreground and fetches deltas from a server and then updates the badge based on locally computed badge counts, or the application is closed or backgrounded so it relies on a server-computed badge count encoded into a push notification representing best known and persisted data at the notification push time. In some examples, deltas that are fetched from a server indicate how the data represented in the badge has changed. For example, if a badge shows that two unread messages are available, and a fetched delta indicates a plus one or a positive increment, among others, then the badge may be changed to show that three unread messages are available.

However, when the two or more applications are installed on the same device, and the operating system does not allow one application to directly interact with another (e.g., the applications are sandboxed), depending on how a notification is pushed or presented to one application, the other application may not have access to the updated badge count. For example, a first application and a second application are installed on a device and are both useable to share content between a first account and one or more contact accounts. When an event that causes a change in a badge count is detected (e.g., a new message, a new post, etc.), the system may determine which of the first application or the second application to use to display the change in the badge count. For example, if the event includes a new message and the message is associated with a select contact that would otherwise receive the message and notification in a second application, but has the first application in the foreground of the device, the message and or notification may delivered via the first application and the second application will not have a push delivered to it indicating a change in a badge count.

As such, when the event is determined to not be associated with a select contact account, the system may determine, based on the event, a first badge count change. When the event is determined to be associated with a selected contact account, system may determine, based on the event, a second badge count change. Then, the system may output the badge count to the respective application that needs an update since, for example it didn't receive a badge count update with a push notification. Additionally, the system may detect a change in badge count when an indication is received that one or more of an item of the first application or second application has been viewed, a new item has been received, or an unsend request, associated with an unviewed item, has been received. Further, the indication may increase or decrease the badge count. For example, an indication that an item of the first application or second application has been viewed may decrease the badge count, an indication that a new item has been received may increase the badge count, and an unsend request, associated with an unviewed item, that has been received may decrease the badge count.

Additionally, the system may detect multiple events that may otherwise trigger a change in a badge count. However, the system may determine that some of the events are of a same type of change and may either be added together to consolidate a badge update to one event rather than two, or the same type of change may cancel each other out such that no badge update may be needed. For example, a user may receive two messages belonging to the same conversation, in such case, the badge count may only need to be updated to reflect that one conversation has new unread content. In another example, a user may receive a new message to a first conversation and receive an unsend request in another conversation. In such case, the badge count would otherwise increment up one count due to the new message and increment down one count due to the unsend request, but by combining the two events the system may determine that the badge count need not be updated thus saving the resources associated with a badge-only update transmission.

FIGS. 12B and 13B show illustrative badging. For example, FIG. 12B shows badge 1216 indicating five unread messages or conversations with unread or unviewed content. For example, badge 1216 may be associated with user interface 1200a shown in FIG. 12A. In another example, FIG. 13B shows badge 1316 indicating three unread messages or conversations with unread or unviewed content. For example, badge 1316 may be associated with user interface 1300a shown in FIG. 13A.

Figure 14:
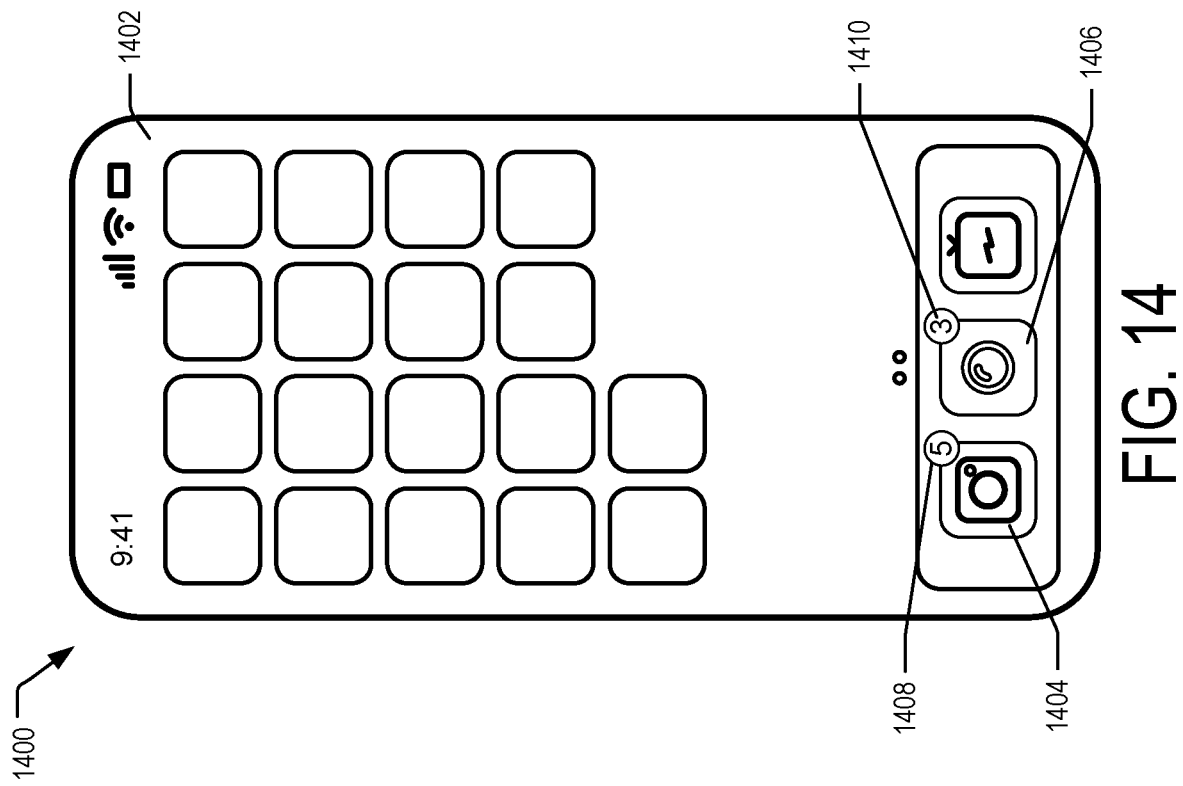
FIG. 14 is a schematic diagram showing an additional user interface with example notifications and badging.

FIG. 14 shows an illustrative device 1400 displaying home screen 1402 with multiple application icons. For example, icon 1404 may be associated with a first application and icon 1406 may be associated with a second application. Badge 1408 may represent a number of unread messages or conversations with unread or unviewed content available in the first application while badge 1410 represents the number of unread messages or conversations with unread or unviewed content available in the second application. For example, badge 1408 may be associated with user interface 1200a shown in FIG. 12A while badge 1410 may be associated with user interface 1300a shown in FIG. 13A.

Example System and Device

Figure 15:
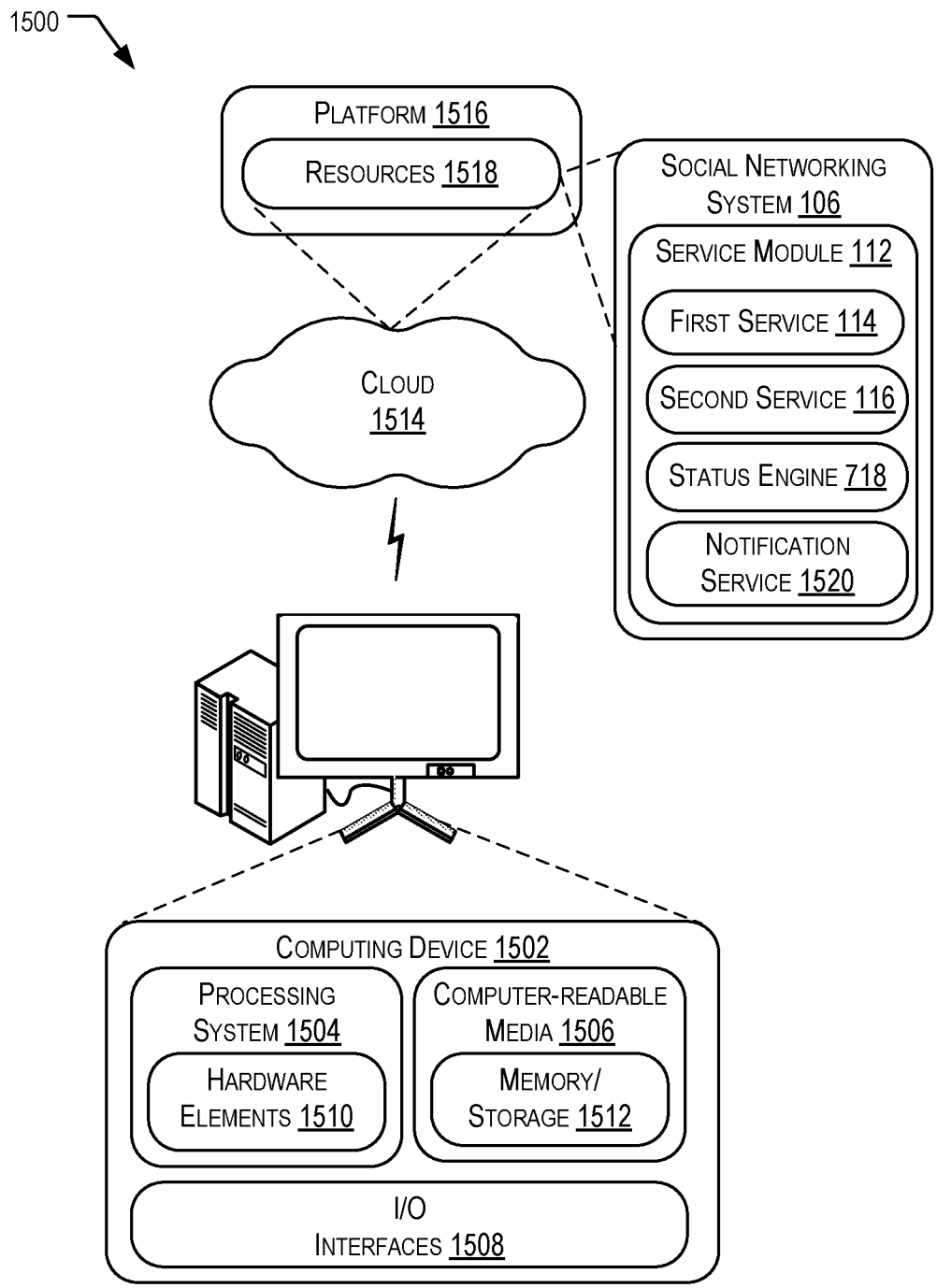
FIG. 15 is a schematic view of an example computing system usable to implement techniques described herein.

FIG. 15 illustrates an example system 1500 that includes an example computing device 1502 that is representative of one or more computing systems and/or devices that may implement the various techniques described herein. This is illustrated through inclusion of the social networking system 106 configured to control a number of users participating in a beta version of a service. The computing device 1502 may be, for example, a server of a service provider, a device associated with a client (e.g., a client device), an on-chip system, and/or any other suitable computing device or computing system.

The example computing device 1502 as illustrated includes a processing system 1504, one or more computer-readable media 1506, and one or more I/O interface 1508 that are communicatively coupled, one to another. Although not shown, the computing device 1502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware element 1510 that may be configured as processors, functional blocks, and so forth. This may include implementation in hardware as an application specific integrated circuit or other logic device formed using one or more semiconductors. The hardware elements 1510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1506 is illustrated as including memory/storage 1512. The memory/storage 1512 represents memory/storage capacity associated with one or more computer-readable media. The memory/storage component 1512 may include volatile media (such as random access memory (RAM)) and/or nonvolatile media (such as read only memory (ROM), Flash memory, optical disks, magnetic disks, and so forth). The memory/storage component 1512 may include fixed media (e.g., RAM, ROM, a fixed hard drive, and so on) as well as removable media (e.g., Flash memory, a removable hard drive, an optical disc, and so forth). The computer-readable media 1506 may be configured in a variety of other ways as further described below.

Input/output interface(s) 1508 are representative of functionality to allow a user to enter commands and information to computing device 1502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "logic," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on and/or transmitted across some form of computer-readable media. The computer-readable media may include a variety of media that may be accessed by the computing device 1502. By way of example, and not limitation, computer-readable media may include "computer-readable storage media" and "computer-readable transmission media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable transmission media" may refer to a medium that is configured to transmit instructions to the hardware of the computing device 1502, such as via a network. Computer-readable transmission media typically may transmit computer-readable instructions, data structures, program modules, or other data in a modulated data signal, such as carrier waves, data signals, or other transport mechanism. Computer-readable transmission media also include any information delivery media. The term "modulated data signal" means a signal that has one or more of its characteristics set or changed in such a manner as to encode information in the signal. By way of example, and not limitation, computer-readable transmission media include wired media such as a wired network or direct-wired connection, and wireless media such as acoustic, radio frequency (RF), infrared, and other wireless media.

As previously described, hardware elements 1510 and computer-readable media 1506 are representative of modules, programmable device logic and/or device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1510. The computing device 1502 may be configured to implement particular instructions and/or functions corresponding to the software and/or hardware modules. Accordingly, implementation of a module that is executable by the computing device 1502 as software may be achieved at least partially in hardware, e.g., through use of computer-readable storage media and/or hardware elements 1510 of the processing system 1504. The instructions and/or functions may be executable/operable by one or more articles of manufacture (for example, one or more computing devices 1502 and/or processing systems 1504) to implement techniques, modules, and examples described herein.

The techniques described herein may be supported by various configurations of the computing device 1502 and are not limited to the specific examples of the techniques described herein. This functionality may also be implemented all or in part through use of a distributed system, such as over a "cloud" 1514 via a platform 1516 as described below.

The cloud 1514 includes and/or is representative of a platform 1516 for resources 1518. The platform 1516 abstracts underlying functionality of hardware (e.g., servers) and software resources of the cloud 1514. The resources 1518 may include applications and/or data that can be utilized while computer processing is executed on servers that are remote from the computing device 1502. Resources 1518 can also include services provided over the Internet and/or through a subscriber network, such as a cellular or Wi-Fi network. For example, resources 1518 may be used to abstract and provide a social networking system 106 with service modules 112 that provide multiple services and functionality including for example, a status engine 718, a notification service 1520, among others.

The platform 1516 may abstract resources and functions to connect the computing device 1502 with other computing devices. The platform 1516 may also be scalable to provide a corresponding level of scale to encountered demand for the resources 1518 that are implemented via the platform 1516. Accordingly, in an interconnected device embodiment, implementation of functionality described herein may be distributed throughout multiple devices of the system 1500. For example, the functionality may be implemented in part on the computing device 1502 as well as via the platform 1516 which may represent a cloud computing environment 1514.

CONCLUSION

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing system comprising:
   one or more processors; and
   memory storing one or more computer-executable instructions that are executable by the one or more processors to perform operations comprising:
   determining that a first application and a second application are installed on a device and are both useable to share content between a first account and one or more contact accounts;
   receiving content associated with an account of the one or more contact accounts and associated with the first application and the second application;
   generating a notification associated with the content;
   determining which of the first application or the second application to use to present the notification; and
   outputting the notification to the determined first application or the second application.

2. The computing system of claim 1, wherein the determining which of the first application or the second application to use to present the notification comprises:
   determining that the first application is in a foreground of the device;
   determining whether the first application is displaying a conversation associated with content;
   when the first application is in the foreground and displaying the conversation associated with the content, displaying the content in the conversation and refraining from displaying the notification in the first application and second application; and
   when the first application is in the foreground and not displaying the conversation associated with the content, delivering the notification to the first application and refraining from displaying the notification in the second application.

3. The computing system of claim 1, wherein the determining which of the first application or the second application to use to present the notification comprises:
   determining that the first application is not in a foreground of the device;
   determining whether the second application is in the foreground of the device;
   when the second application is determined to not be in the foreground, delivering the notification to the second application, and refraining from displaying the notification in the first application;
   when the second application is determined to be in the foreground, determining whether the second application is displaying a conversation associated with content;
   when the second application is determined to be in the foreground and displaying the conversation associated with the content, displaying the content in the conversation and refraining from displaying the notification in the first application and second application; and
   when the second application is determined to be in the foreground and not displaying the conversation associated with the content, delivering the notification to the second application and refraining from displaying the notification in the first application.

4. The computing system of claim 1, wherein the determining which of the first application or the second application to use to present the notification includes at least one of:
   selecting the second application when the content is associated with a first contact account of the one or more contact accounts, the first contact account being associated with a designated list of contact accounts, and
   selecting the first application when the content is associated with a second contact account of the one or more contact accounts, the second contact account not being associated with the designated list of contact accounts.

5. The computing system of claim 4, wherein the determining which of the first application or the second application to use to present the notification includes:
   determining the first application is in a foreground of the device; and
   delivering the notification to the first application and refraining from displaying the notification in the second application.

6. The computing system of claim 1, wherein the determining which of the first application or the second application to use to present the notification is done at the device.

7. The computing system of claim 1, wherein the notification comprises at least one of a banner notification, a lock screen notification, a badge count notification, or a notification center notification.

8. A method comprising:
determining that a first application and a second application are installed on a device and are both useable to share content between a first account and one or more contact accounts;
receiving content associated with an account of the one or more contact accounts and associated with the first application and the second application;
generating a notification associated with the content;
determining which of the first application or the second application to use to present the notification; and
outputting the notification to the determined first application or the second application.

9. The method of claim 8, wherein the determining which of the first application or the second application to use to present the notification comprises:
determining that the first application is in a foreground of the device;
determining whether the first application is displaying a conversation associated with content;
when the first application is in the foreground and displaying the conversation associated with the content, displaying the content in the conversation and refraining from displaying the notification in the first application and second application; and
when the first application is in the foreground and not displaying the conversation associated with the content, delivering the notification to the first application and refraining from displaying the notification in the second application.

10. The method of claim 8, wherein the determining which of the first application or the second application to use to present the notification comprises:
determining that the first application is not in a foreground of the device;
determining whether the second application is in the foreground of the device;
when the second application is determined to not be in the foreground, delivering the notification to the second application, and refraining from displaying the notification in the first application;
when the second application is determined to be in the foreground, determining whether the second application is displaying a conversation associated with content;
when the second application is determined to be in the foreground and displaying the conversation associated with the content, displaying the content in the conversation and refraining from displaying the notification in the first application and second application; and
when the second application is determined to be in the foreground and not displaying the conversation associated with the content, delivering the notification to the second application and refraining from displaying the notification in the first application.

11. The method of claim 8, wherein the determining which of the first application or the second application to use to present the notification includes at least one of:
selecting the second application when the content is associated with a first contact account of the one or more contact accounts, the first contact account being associated with a designated list of contact accounts, and
selecting the first application when the content is associated with a second contact account of the one or more contact accounts, the second contact account not being associated with the designated list of contact accounts.

12. The method of claim 11, wherein the determining which of the first application or the second application to use to present the notification includes:
determining the first application is in a foreground of the device; and
delivering the notification to the first application and refraining from displaying the notification in the second application.

13. The method of claim 8, wherein the determining which of the first application or the second application to use to present the notification is done at the device.

14. A method comprising:
determining that a first application and a second application are installed on a device and are both useable to share content between a first account and one or more contact accounts;
receiving content associated with an account of the one or more contact accounts and associated with the first application and the second application;
determining which of the first application or the second application to use to present a notification associated with the received content;
generating a notification associated with the content for the determined first application or second application and refraining from generating a notification associated with the content for the first application or second application not determined to use to present the notification; and
outputting the notification to the determined first application or the second application.

15. The method of claim 14, wherein the determining which of the first application or the second application to use to present the notification comprises:
determining that the first application is in a foreground of the device;
determining whether the first application is displaying a conversation associated with content;
when the first application is in the foreground and displaying the conversation associated with the content, displaying the content in the conversation and refraining from displaying the notification in the first application and second application; and
when the first application is in the foreground and not displaying the conversation associated with the content, delivering the notification to the first application and refraining from displaying the notification in the second application.

16. The method of claim 14, wherein the determining which of the first application or the second application to use to present the notification comprises:
determining that the first application is not in a foreground of the device;
determining whether the second application is in the foreground of the device;
when the second application is determined to not be in the foreground, delivering the notification to the second application, and refraining from displaying the notification in the first application;

when the second application is determined to be in the foreground, determining whether the second application is displaying a conversation associated with content;

when the second application is determined to be in the foreground and displaying the conversation associated with the content, displaying the content in the conversation and refraining from displaying the notification in the first application and second application; and when the second application is determined to be in the foreground and not displaying the conversation associated with the content, delivering the notification to the second application and refraining from displaying the notification in the first application.

17. The method of claim 14, wherein the determining which of the first application or the second application to use to present the notification comprises:

selecting the second application when the content is associated with a first contact account of the one or more contact accounts, the first contact account being associated with a designated list of contact accounts, and selecting the first application when the content is associated with a second contact account of the one or more contact accounts, the second contact account not being associated with the designated list of contact accounts.

18. The method of claim 17, wherein the determining which of the first application or the second application to use to present the notification comprises:

determining the first application is in a foreground of the device; and delivering the notification to the first application and refraining from displaying the notification in the second application.

19. The method of claim 14, wherein the determining which of the first application or the second application to use to present the notification is done at the device.

20. The method of claim 14, wherein the notification comprises at least one of a banner notification, a lock screen notification, a badge count notification, or a notification center notification.

* * * * *